(12) United States Patent
Wittig et al.

(10) Patent No.: US 6,823,489 B2
(45) Date of Patent: Nov. 23, 2004

(54) GENERATION OF DECISION FEEDBACK EQUALIZER DATA USING TRELLIS DECODER TRACEBACK OUTPUT IN AN ATSC HDTV RECEIVER

(75) Inventors: Karl R. Wittig, New York, NY (US); Dagnachew Birru, Yorktown Heights, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 578 days.

(21) Appl. No.: 09/840,218

(22) Filed: Apr. 23, 2001

(65) Prior Publication Data

US 2002/0154248 A1 Oct. 24, 2002

(51) Int. Cl.[7] .............................................. H03M 13/03
(52) U.S. Cl. ..................... 714/792; 375/265; 348/614
(58) Field of Search .......................... 714/792; 375/341, 375/233, 229, 232, 350; 348/607; 708/323, 322

(56) References Cited

U.S. PATENT DOCUMENTS

| | | | | |
|---|---|---|---|---|
| 5,056,117 A | * | 10/1991 | Gitlin et al. ................. | 375/341 |
| 5,453,797 A | * | 9/1995 | Nicolas et al. ............... | 348/607 |
| 5,636,251 A | * | 6/1997 | Citta et al. ................... | 375/341 |
| 5,784,415 A | * | 7/1998 | Chevillat et al. ............. | 375/341 |
| 6,141,384 A | * | 10/2000 | Wittig et al. ............ | 375/240.25 |
| 6,529,558 B1 | * | 3/2003 | Fimoff et al. ................ | 375/262 |

OTHER PUBLICATIONS

G. Ungerboeck, "Trellis–Coded Modulation With Redundant Signal Set, Paret 1, Introduction, Part 11, State of the Art", IEEE Communication Magazine, vol. 25, pp 5–21, Feb. 1997.*

H. Taub et al., "Principles of Communication Systems", 2nd Edition, pp 562–571, McGraw Hill, NY, 1986.*

Viterbi et al., "Principles of Digital Communication and Coding", McGraw Hill, NY, 1979.*

Technical Paper Entitled "A Programmable Parallel Processor Archecture for a Viterbi Detector", H. Loe et al., Globecom 1990.*

Technical Paper Entitled "Memory Management in a Verterbi Decoder", C.M. Rader, IEEE Trans. Comms., vol. com–29, No. 9, Sep. 1981.*

G. Ungerboeck, "Trellis–Coded Modulation with Redundant Signal Set, Part1, Introduction; Part 11,State of the Art", IEEE Communication Magazine, vol. 25, pp. 5–21, Feb. 1997.

(List continued on next page.)

*Primary Examiner*—Albert Decady
*Assistant Examiner*—John P Trimmings

(57) ABSTRACT

For use in a receiver capable of decoding trellis encoded signals of the type comprising a trellis decoder and a decision feedback equalizer coupled to each path memory output of said trellis decoder, wherein said decision feedback equalizer is capable of obtaining symbol values from each path memory output of said trellis decoder for use as estimates in channel equalization, an apparatus and method is disclosed for reconstructing symbol values from trace back path information stored within said trellis decoder. The apparatus and method of the present invention reconstructs a symbol stream from the trellis decoder using data signal selection circuitry to obtain bit values that represent the reconstructed symbols. In one embodiment of the present invention, each of a plurality of multiplexers selects one of four symbol value inputs to send to a first adaptive filter tap cell in a set of twelve adaptive filter tap cells. The four symbol values represent (1) a symbol at trellis point "t", and (2) a symbol at trellis point "t–12", and (3) a symbol having the value "plus five", and (4) a symbol having the value "minus five."

24 Claims, 15 Drawing Sheets

OTHER PUBLICATIONS

H. Taub et al, "Principles of Communication Systems", $2^{nd}$ Edition, pp. 562–571, McGraw Hill, NY, 1986.

Viterbi et al, "Principles of Digital Communication and Coding", McGraw Hill NY, 1979.

Technical Paer Entitled "A Programmable Parallel Processor Architecture for a Viterbi Detector" H. Lou et al, Globecom 1990.

Technical Paper Entitled "Memory Management in a Viterbi Decoder", C.M. Rader, IEEE Trans. Comms., vol. COM–29, No. 9, Sep. 1981.

* cited by examiner

|  | PS | NS |  |
|---|---|---|---|
| X1 | D1 D0 | D1 D0 | Z1 Z0 |
| 0 | 0 0 | 0 0 | 0 0 |
| 0 | 0 1 | 1 0 | 0 1 |
| 0 | 1 0 | 0 1 | 0 0 |
| 0 | 1 1 | 1 1 | 0 1 |
| 1 | 0 0 | 0 1 | 1 0 |
| 1 | 0 1 | 1 1 | 1 1 |
| 1 | 1 0 | 0 0 | 1 0 |
| 1 | 1 1 | 1 0 | 1 1 |

GENERATION OF DECISION FEEDBACK EQUALIZER DATA USING TRELLIS DECODER TRACEBACK OUTPUT IN AN ATSC HDTV RECEIVER

CROSS-REFERENCE TO RELATED APPLICATIONS

The invention disclosed in this patent application is related to the invention disclosed in U.S. patent application Ser. No. 09/840,204 by M. Ghosh et al. entitled "System and Method for Reducing Error Propagation in a Decision Feedback Equalizer of an ATSC VSB Receiver" filed concurrently with this patent application. The invention disclosed in this patent application is also related to the invention disclosed in U.S. patent application Ser. No. 09/829,788 by D. Birru entitled "A Two Stage Equalizer for Trellis Coded Systems" filed concurrently with this patent application. The related patent applications are commonly assigned to the assignee of the present invention. The disclosures of the related patent applications are hereby incorporated by reference in the present patent application as if fully set forth herein.

TECHNICAL FIELD OF THE INVENTION

The present invention is directed, in general, to digital communication devices and, more specifically, to a system and method for reducing errors in a decision feedback equalizer in an ATSC VSB receiver by utilizing symbol stream information from a trellis decoder.

BACKGROUND OF THE INVENTION

The Digital High Definition Television (HDTV) Grand Alliance (Grand Alliance) is a group of television manufacturing and research organizations in the television industry. After years of cooperative effort the Grand Alliance developed and proposed a standard for digital HDTV systems. The Grand Alliance standard has been adopted (with a few changes) by the Federal Communication Commission (FCC) as an official broadcasting standard for HDTV. The standard is known as the Advanced Television Systems Committee Digital Television Standard (the "ATSC Standard").

The ATSC Standard for HDTV transmission over terrestrial broadcast channels uses a signal that consists of a sequence of twelve (12) independent time-multiplexed trellis-coded data streams modulated as an eight (8) level vestigial sideband (VSB) symbol stream with a rate of 10.76 MHz. This signal is converted to a six (6) MHz frequency band that corresponds to a standard VHF or UHF terrestrial television channel, over which the signal is then broadcast.

The ATSC Standard calls for two (2) bit data symbols of the HDTV signal to be trellis encoded in accordance with an eight (8) level (i.e., a three (3) bit) one dimensional constellation. One bit of each data symbol is pre-coded, and the other is subjected to a 1/2 encoding rate that produces two coded bits in accordance with a four (4) state trellis code. For purposes of interleaving, twelve (12) identical encoders and pre-coders operate successively on every twelve successive data symbols. Symbols 0, 12, 24, 36, . . . are encoded as one series. Symbols 1, 13, 25, 37, . . . as a second series. Symbols 2, 14, 26, 38, . . . as a third series. And so on for a total of twelve (12) series. Therefore, the ATSC Standard requires twelve (12) trellis decoders in the HDTV receiver for the twelve (12) series of time division interleaved data symbols in the signal. Each trellis decoder in the HDTV receiver decodes every twelfth (12th) data symbol in the stream of coded data symbols.

In an ATSC Standard receiver trellis decoders are used to retrieve the original digital data that was trellis encoded just before being converted to 8-VSB symbols, modulated and broadcast. The use of trellis coding provides an improvement in the signal to noise ratio of the received signal, and the time multiplexing of twelve (12) independent streams reduces the possibility of co-channel interference from an analog NTSC broadcast signal residing on the same frequency. The abbreviation NTSC stands for National Television Standards Committee.

Each of the trellis decoders for the four (4) state trellis code operates in accordance with the well-known Viterbi decoding algorithm. Each of the decoders comprises a branch metric generator unit, an add-compare-select unit, and a path-memory unit. See, for example, "Trellis-coded Modulation With Redundant Signal Set, Part I, Introduction; Part II, State of the Art," by G. Ungerboeck, IEEE Communications Magazine, Vol. 25, pp. 5–21, February 1987.

In addition to being corrupted by noise, the transmitted signal is also subject to deterministic channel distortions and distortions caused by multipath interference. Consequently, an adaptive channel equalizer is generally used in front of the trellis decoders to compensate for these effects. The goal is to create a symbol stream that resembles, as much as possible, the symbol stream that was created by the twelve (12) trellis encoders at the transmitter.

One commonly used equalizer architecture makes use of a second equalizer known as a decision feedback equalizer (DFE). In this architecture, a conventional, or forward equalizer (FE) is supplemented by a DFE. The input to the DFE is an estimate of the original transmitted value of the current output symbol of the complete equalizer (FE and DFE). The output of the decision feedback equalizer (DFE) is subsequently added to the output of the forward equalizer (FE) to generate the output symbol. In a typical implementation, this estimate of the output symbol is obtained by simply "slicing" the equalizer output. The term "slicing" refers to the process of taking the allowed symbol value (of the eight (8) levels specified by the 8-VSB ATSC Standard) that is nearest to that of the actual output. Using the "sliced" symbols in a decision feedback equalizer (DFE) gives a near optimum error rate performance with low complexity. This approach, however, can suffer from error propagation caused by slicing errors. Because the typical symbol error rate after the equalizer for the HDTV signal can be up to twenty percent (20%), this can be a serious problem if the number of DFE filter taps is large.

After the equalizer, the HDTV signal is decoded in a trellis decoder that uses the Viterbi algorithm to decode the symbol stream based on the 1/2 rate trellis coding performed in the transmitter. As previously mentioned, the ATSC Standard specifies that twelve (12) trellis encoders and decoders are used in parallel in a time multiplexed fashion. Trellis decoding is then followed by byte de-interleaving and Reed Solomon decoding to further correct transmission errors in the signal.

There is a need in the art for a system and method that will reduce error propagation in a decision feedback equalizer used in an ATSC VSB receiver.

SUMMARY OF THE INVENTION

To address the above-discussed deficiencies of the prior art, the system and method of the present invention reduces error propagation in a decision feedback equalizer in an ATSC VSB receiver by utilizing symbol stream information from a trellis decoder.

The output symbols from the adaptive channel equalizer are input to a trellis decoder. The trellis decoder uses "soft" decision making to determine the most likely symbol values that were originally transmitted as opposed to "hard" decision making such as "slicing." Soft decision methods take into account the restricted set of values that the symbol following a symbol having a given value is permitted to assume by the trellis encoder. Soft decision methods use this additional information to obtain a more reliable estimate of the actual value than can be obtained by hard decision methods that only consider the current symbol.

The system and method of the present invention uses information from the trellis decoder to generate an estimate of the equalizer output that serves as the input to the decision feedback equalizer (DFE). The system and method of the present invention essentially incorporates a trellis decoder into the equalizer to provide the estimates of the actual symbol values that are needed by the decision feedback equalizer (DFE). Due to the nature of the Viterbi algorithm, which performs a trace-back over a path consisting of previously received symbols and having a specified length, an estimate is provided not only for the current symbol, but for all of the previous symbols that constitute this path. Since the Viterbi algorithm is known to provide the best estimate of the value of the transmitted symbol data under conditions of Gaussian channel noise, such an approach results in more reliable data being input to the decision feedback equalizer (DFE) than was possible using simple slicing of the equalizer output. This in turn results in better equalizer performance, and therefore in more reliable data being input to the trellis decoder.

A related method uses a second equalizer, whose decision feedback equalizer (DFE) input is the output of this trellis decoder as well as the training sequence for the equalizer adaptation. Since the trellis decoder provides an optimum estimate of the symbol data, its output can be reliably used as a training sequence even though it is only an estimate and does not constitute a priori knowledge of the transmitted data as is the case with a known training sequence.

The ATSC trellis decoder system consisting of twelve (12) time multiplexed Viterbi decoders is fairly complicated and requires a substantial amount of hardware to implement. Also, an adaptive channel equalizer is, in general, the most complicated component of a digital data demodulator in terms of the amount of hardware required to implement it. It is also therefore the most expensive component.

A trellis decoder in accordance with the principles of the present invention is adapted for decoding each of a plurality of interleaved series of data symbols, each series having been trellis encoded in accordance with a multi-level constellation of permissible trellis code values. Such a decoder comprises a branch metric generator for deriving for each series the branch metrics of each of the trellis states as successively determined for successive data symbols in such series. The branch metric and trellis state information is supplied to an add-compare-select (ACS) unit which determines the best metric paths which are successively updated for each series in accordance with successively received data symbols in each series. The decoder also comprises successive path memory stages, the outputs of each stage being the inputs of the next succeeding stage, each stage receiving from its predecessor and storing a pointer identifying the path having the best metric through the trellis for the previously received data symbol in each of said series, the first stage receiving from the ACS unit and storing a pointer identifying the path having the best metric through the trellis for currently received data symbols in each of said series. The final memory stage thereby will have stored therein a pointer for the trellis states corresponding to the earliest of the data symbols in each of the series of stored trellis states in all of the path memory stages, from which trellis states the fully decoded value of said earliest data symbol is indicated.

According to one feature of the present invention, the decoder makes use of the fact that for certain trellis codes, including the four (4) state code of the ATSC Standard, the trellis states can be divided into a plurality of distinct groups such that the states existing at any time in a given group can only have resulted from preceding trellis states within that same group. In addition, any existing state can only have resulted from a small number of possible predecessor states. Codes having both those characteristics are called "well-defined" codes. In particular, for a larger number of well-defined codes, the number of possible predecessor states depends on the number of trellis coded input bits. That number is one in the ATSC Standard and in the majority of trellis codes presently in use, and hence the number of possible predecessor states in those codes is only two. The four (4) state trellis code of the ATSC Standard is an example of a well-defined code, whereby it is possible to provide two ACS sub-units to respectively derive best metric path data for only the two trellis states in respective ones of first and second groups. Each such ACS sub-unit is thereby much simpler in design and operation that would be a single ACS unit for both of said groups. This approach can be taken for well-defined codes of any number of states. For example, with an eight (8) state code there may be four groups of two (2) states each, and four ACS units would each handle one such group.

According to a further feature of the present invention, the path memory unit is constituted by successive storage sections in a single random access memory (RAM), as the simplification of the path memory unit reduces the required input/output by a similar amount.

Another feature of "well-defined" codes which is exploited in the present invention is the simplification of the path memory required for each state of the trellis code. Since any existing state could have been reached from only a small number "s" of possible predecessor states, it is not necessary to store a pointer to all possible predecessor states. Instead, a pointer is stored which distinguishes between the small set of possible predecessor states. This requires only a number of memory elements at least equal to $\log_2$ s. Use is made of the information identifying the particular sets to clearly determine the pointer to the previous state. This implies that a small penalty may be paid in terms of extra logic required to determine the pointer to the previous state. However, the second condition of the well-defined code, namely that of distinct groups of code states such that those existing at any time in a given group can only have resulted from previous states in that same group, ensures that the extra logic is actually simpler than would be required to implement a conventional path memory unit. Such simplification can achieve a reduction by a factor of two in regard to the memory required for the four (4) state ATSC code, and reduction by a factor of three in the case of an eight (8) state code. The saving in memory capacity is therefore substantial.

A further feature of the present invention which is specific to the four (4) state ATSC code is that the path memory logic required for selection of a pointer among possible predecessor states at every stage is simplified so that the propagation delay in the combinatorial logic required for computation of each traceback portion of the overall path is reduced by a factor of two. This has significant advantages in regard to the speed at which the trellis decoder can be operated and results in fewer logic elements.

An HDTV receiver in accordance with the present invention is adapted to receive a digital HDTV signal having successive data frames each of which includes successive data segments, each segment including successive data symbols, the data symbols being interleaved to form a plurality of data streams which are each trellis encoded in accordance with a code having a multi-level constellation of permissible code values. Such receiver includes a trellis decoder as described above.

It is an object of the present invention to provide a system and method for reducing errors in a decision feedback equalizer in an ATSC VSB receiver by utilizing symbol stream information from a trellis decoder.

It is another object of the present invention to provide a system and method for decoding "best guess" values for symbols in a trellis decoder.

It is also an object of the present invention to provide a system and method that sends "best guess" values for symbols from a trellis decoder to decision feedback equalizer in an ATSC VSB receiver.

It is another object of the present invention to provide a system and method for performing channel equalization in an ATSC VSB receiver with a decision feedback equalizer that uses "best guess" values for symbols from a trellis decoder.

It is also an object of the present invention to provide a system and method for reducing errors in a decision feedback equalizer in an ATSC VSB receiver by utilizing a first combination of a first equalizer unit and a first trellis decoder and a second combination of a second equalizer unit and a second trellis decoder.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 15, discussed below, and the various embodiments used to describe the principles of the present invention in this patent document are by way of illustration only and should not be construed in any way to limit the scope of the invention. In the description of the exemplary embodiment that follows, the present invention is integrated into, or is used in connection with, a high definition television system. Those skilled in the art will recognize that the exemplary embodiment of the present invention may easily be modified for use in other similar types of systems for modulating and demodulating digital data.

Figure 1:
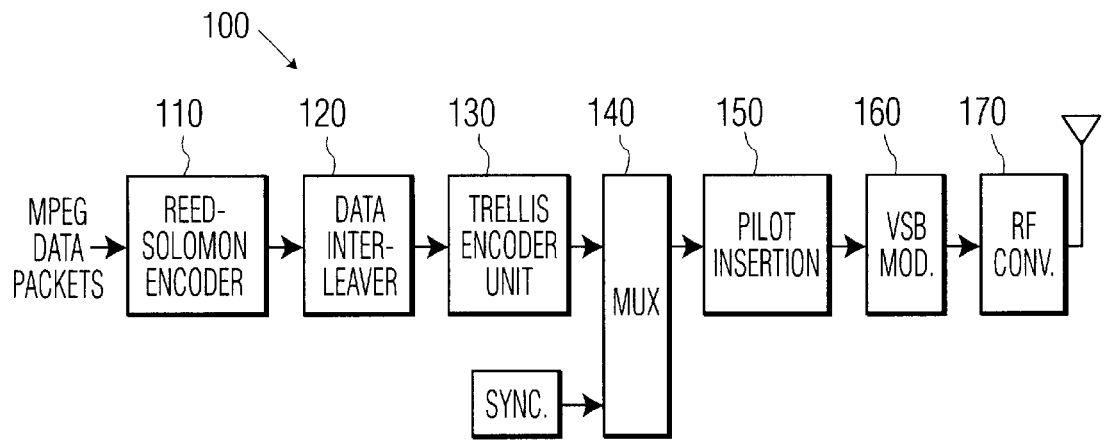
FIG. 1 illustrates a block diagram of an exemplary high definition television (HDTV) transmitter.

FIG. 1 illustrates a block diagram of an exemplary high definition television (HDTV) transmitter 100. MPEG compatible data packets are encoded for forward error correction (FEC) by a Reed Solomon (RS) encoder 110. The data packets in successive segments of each data field are then interleaved by data interleaver 120, and the interleaved data packets are then further interleaved and encoded by trellis encoder unit 130. Trellis encoder unit 130 produces a stream of data symbols representing three (3) bits for each symbol. One of the three bits is pre-coded and the other two bits are produced by a four (4) state trellis encoding.

As will be more fully discussed, trellis encoder unit 130 comprises twelve (12) parallel trellis encoder and pre-coder units to provide twelve interleaved coded data sequences. The encoded three (3) bits of each trellis encoder and pre-coder unit are combined with field and segment synchronization bit sequences in multiplexer 140. A pilot signal is inserted by pilot insertion unit 150. The data stream is then subjected to vestigial sideband (VSB) suppressed carrier eight (8) level modulation by VSB modulator 160. The data stream is then finally up-converted to a radio frequency by radio frequency (RF) by converter 170.

Figure 2:
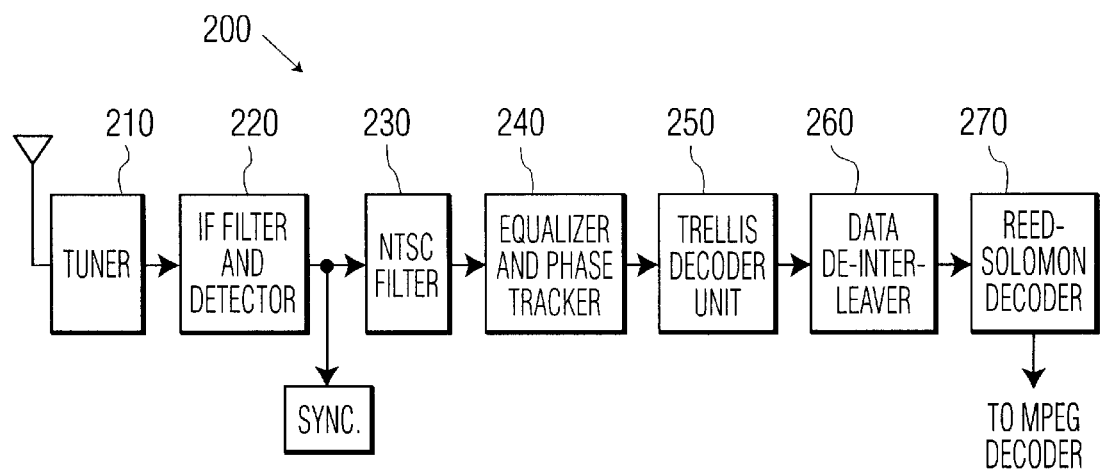
FIG. 2 illustrates a block diagram of an exemplary high definition television (HDTV) receiver.

FIG. 2 illustrates a block diagram of an exemplary high definition television (HDTV) receiver 200. The received RF signal is down-converted to an intermediate frequency (IF) by tuner 210. The signal is then filtered and converted to digital form by IF filter and detector 220. The detected signal is then in the form of a stream of data symbols that each signify a level in an eight (8) level constellation. The signal is then filtered by NTSC rejection filter 230 and subjected to equalization and phase tracking by equalizer and phase tracker unit 240. The recovered encoded data symbols are then subjected to trellis decoding by trellis decoder unit 250. The decoded data symbols are then further de-interleaved by data de-interleaver 260. The data symbols are then subjected to Reed-Solomon decoding by Reed Solomon decoder 270. This recovers the MPEG compatible data packets transmitted by transmitter 100.

Figure 3:
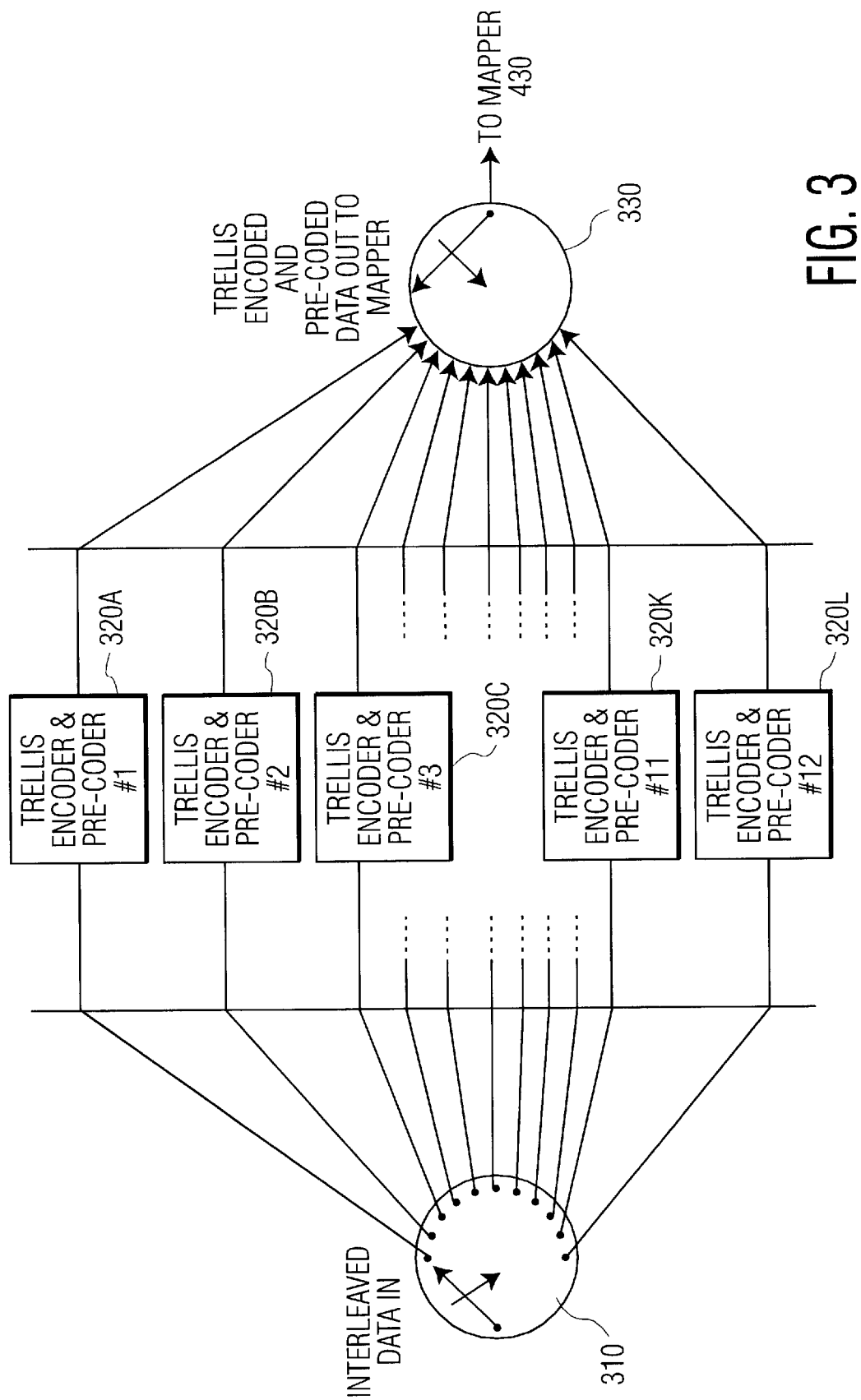
FIG. 3 illustrates s a block diagram of a trellis encoder comprising twelve (12) parallel trellis encoder and pre-coder units for twelve groups of interleaved data symbols.

FIG. 3 illustrates how the interleaved data from data interleaver 120 are further interleaved during the trellis encoding process. Demultiplexer 310 of trellis encoder unit 130 distributes each successive series of twelve (12) data symbols among twelve (12) successive trellis encoder and pre-coder units 320A, 320B, 320C, . . . , 320K, and 320L. The encoded outputs of the twelve (12) successive trellis encoder and pre-coder units are then time division multiplexed by multiplexer 330 to form a single data stream. The single data stream is sent to eight (8) level symbol mapper 430 of trellis encoder unit 130.

Figure 4:
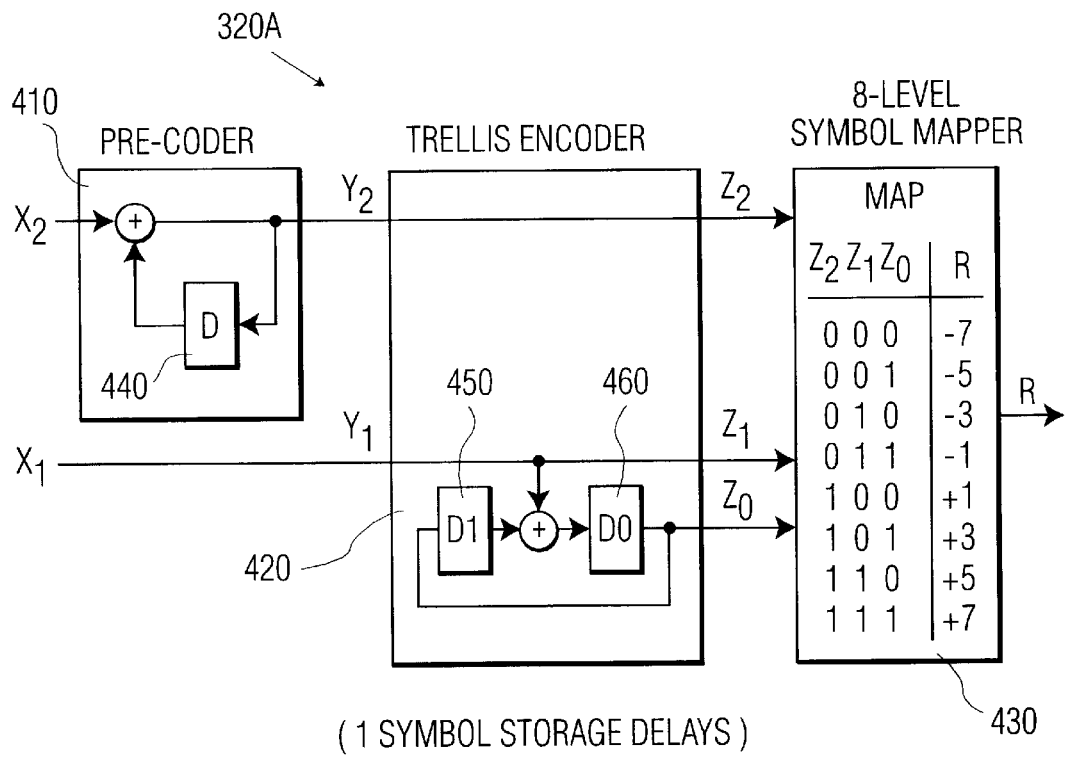
FIG. 4 illustrates a block diagram of one exemplary trellis encoder and pre-coder unit (one of the twelve (12) such units shown in FIG. 3) and an eight (8) level symbol mapper.

FIG. 4 illustrates a block diagram of an exemplary trellis encoder and pre-coder unit 320A and its output to eight (8) level symbol mapper 430. Not shown in FIG. 4 is multiplexer 330 that couples trellis encoder and pre-coder unit 320A to eight (8) level symbol mapper 430. Trellis encoder and pre-coder unit 320A comprises pre-coder 410 and trellis encoder 420. Each data symbol to be encoded comprises two bits, $X_1$ and $X_2$. Bit $X_2$ is pre-coded by pre-coder 410 which comprises a one bit register 440 to derive precoded bit $Y_2$. Bit $Y_2$ is not altered further by trellis encoder 420 and is output as bit $Z_2$.

The other input bit, $X_1$, does not pass through pre-coder 410. Bit $X_1$ (also denoted bit $Y_1$) does pass through trellis encoder 420. Trellis encoder 420 encodes bit $X_1$ in accordance with a rate 1/2 trellis code utilizing one bit data registers 450 and 460. The result is output as bit $Z_0$ and bit $Z_1$. Therefore, three bits (i.e., bit $Z_0$, bit $Z_1$, and bit $Z_2$) are output by trellis encoder 420 to eight (8) level symbol mapper 430. Eight (8) level symbol mapper 430 converts the three bits to a value R in an eight (8) level constellation of permissible code values. The permissible code values for R are −7, −5, −3, −1, +1, +3, +5, and +7. These values correspond with the three bit combinations shown in eight (8) level symbol mapper 430.

Figure 4A:
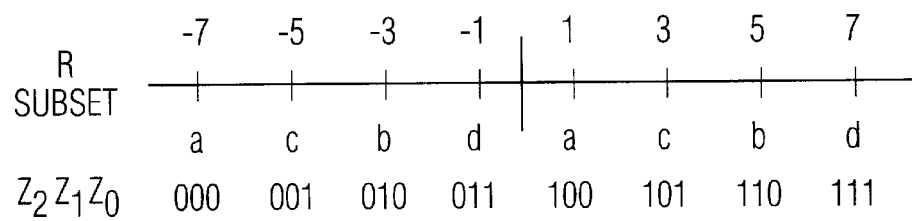
FIG. 4A illustrates the four subsets a, b, c, d of the constellation code values R.

The above described process is carried out for each of the twelve interleaved series of data symbols. Eight (8) level symbol mapper 430 comprises a look-up table for selecting the correct R code value for a given set of three input bits. It is seen that the eight (8) level constellation has four possible subsets of bits $Z_1$ and $Z_0$, each subset having dual possible constellation values depending whether the pre-coded bit $Z_2$ is a zero ("0") or a one ("1"). Those subsets and the corresponding constellation values are shown in FIG. 4A. Further details of the encoder and its operation are given in Appendix D of the ATSC Standard. For a basic description of the logic operations involved in trellis encoding and decoding, refer to "Principles of Communication Systems," by H. Taub et al., $2^{nd}$ edition, pp. 562–571, McGraw Hill, New York, 1986.

Figure 5A:
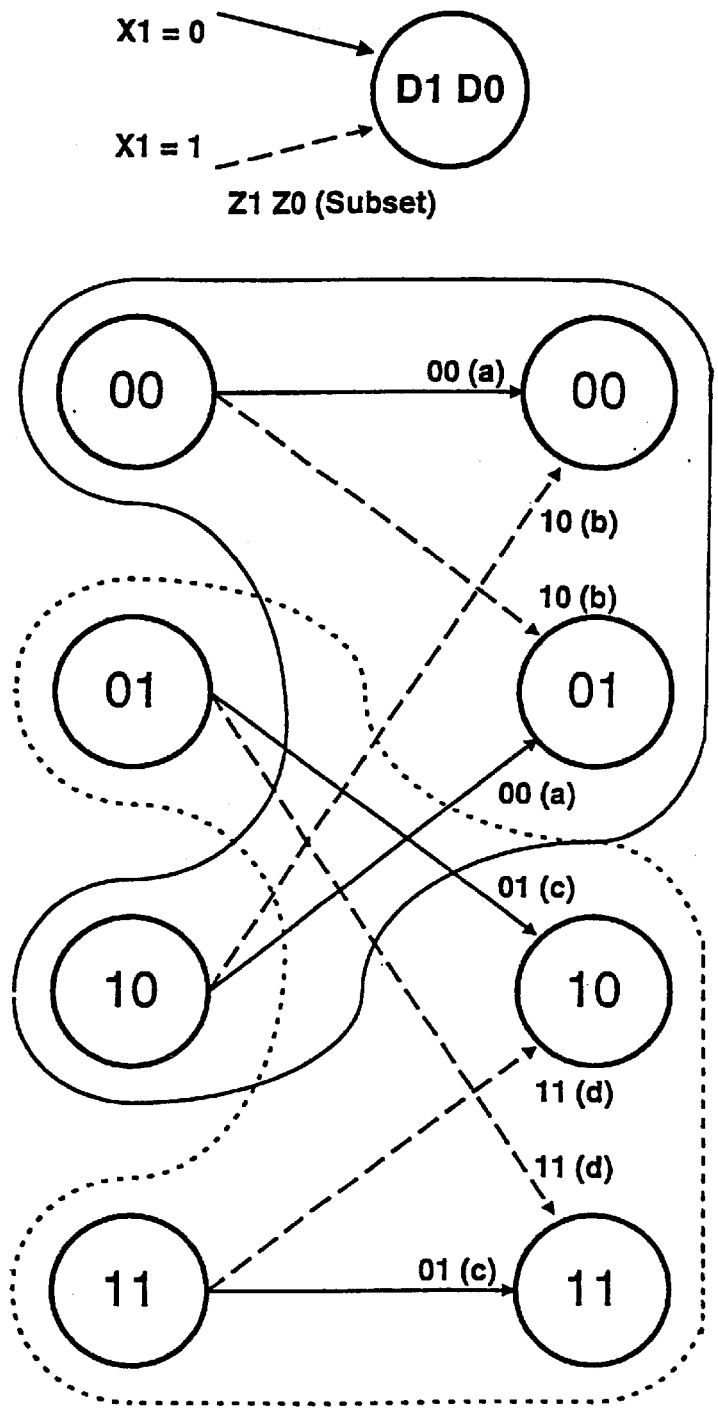
FIGS. 5A, 5B, and 5C illustrate respectively a trellis diagram, a state diagram, and a trellis code value tabulation applicable to the exemplary ATSC trellis encoder shown in FIG. 4.

To understand how a single trellis decoder can decode twelve interleaved series of data symbols obtained from an HDTV signal, refer to the four (4) state trellis diagram in FIG. 5A. FIG. 5A and the corresponding state diagram in FIG. 5B ignore pre-coder 410 in FIG. 4 which supplements trellis encoder 420, because the pre-coding has a very simple inverse which is described in the ATSC Standard. The trellis diagram in FIG. 5A relates to the successive values of uncoded bit $X_1$ in FIG. 4 in successive symbol periods. The two active registers, 450 and 460, have bit values which during any symbol period determine the four (4) possible code states "00", "01", "10", "11". If the next $X_1$ bit is a zero ("0"), the present code state will change to the succeeding state indicated by the solid line leaving the present state, and if the $X_1$ bit is a one ("1"), the present state will change to the succeeding state indicated by a dashed line leaving the present state. The output of the decoder is the $Z_1$, $Z_0$ subset indicated in each case at the end of the state change line.

Thus, for example, if the present code state $D_1$, $D_0$ is "01" and the next $X_1$ bit is a zero ("0"), then the next code state $D_1$, $D_0$ will be "10" and the $Z_1$, $Z_0$ output subset of the decoder will be "01". The pre-coded bit $Z_2$ received by the decoder serves, as described above, to distinguish between the two possible outputs that can result from each transition between trellis states. The possible coded output subsets $Z_1$, $Z_0$ resulting from uncoded input bit $X_1$, and the possible transitions between the present (PS) and next (NS) code states $D_1$, $D_0$ are shown in the table in FIG. 5C. For any given code state (i.e., the values $D_1$, $D_0$ of the bits in registers 450 and 460) only two possible transitions can be produced by the input bit $X_1$, depending on whether it is a zero ("0") or a one ("1"). As seen in FIG. 5A, given a particular initial code state $D_1$, $D_0$ (which is typically "00") a specific sequence of input bits $X_1$ will select a particular path through the trellis diagram. There are four possible values of output $Z_1$, $Z_0$, constituting the above-mentioned four subsets a, b, c and d shown in FIG. 4A and also marked on the state transition lines in FIG. 5A. The code states and possible transitions are also shown in the state diagram in FIG. 5B. Each transition line therein is marked with $$(X_1)/(Z_1Z_0) \quad (1)$$

where $X_1$ is the input bit value and $Z_1 Z_0$ is the resulting coded output subset.

A trellis decoder must reconstruct a transmitted sequence of data symbols from a received noise-corrupted encoded version of the transmitted sequence. The first step is to identify the code subset signified by a received symbol. Selection of the nearest of the two constellation points corresponding to that subset is then made by passing the received symbol through a detector having a threshold set at a level exactly halfway between the two constellation points. In this way an accurate determination can be made as to the encoded symbol that was transmitted.

To evaluate a received sequence of coded symbols, the paths through the trellis diagram must be accurately determined. Essentially, from among all possible paths that exist through the trellis diagram the one that comes "closest" to the actual received symbol sequence must be selected. While this might initially seem to require an inordinate number of calculations, a significant simplification is achieved by making use of the Viterbi algorithm. This is described in the text "Principles of Digital Communication and Coding," by Viterbi et al., McGraw Hill, New York, 1979. According to the Viterbi algorithm, the number of surviving paths at every stage of the trellis decoding process is equal to the total number of trellis states of the trellis code. That is, only one surviving path, consisting of the closest match to the actually received sequence, is continued to the following state of the trellis. This is based on the observation that the match between a received sequence and a specific branch in the trellis can be described in terms of a metric, and the branch metrics are additive. The cumulative metric of a path is called the path metric, and is the sum of all of the branch metrics for that path. Each branch metric corresponds to the difference between the output corresponding to a specific branch within the trellis diagram in FIG. 5A and the actual received symbol value corresponding to that branch.

Accordingly, a Viterbi decoder requires a branch metric generator (BMG) unit which calculates a distance ("branch metric") in each bit period between a received bit value and the bit values of all the trellis paths leading up to the code state existing during that bit period. The branch metrics are supplied to an add-compare-select (ACS) unit that maintains the accumulated path metrics, one for each of the code states. The ACS unit also determines, for each successive new code state, the path having the minimum (i.e., best) path metric to that state and this path is selected and stored in the form of a pointer in a path memory unit (PMU) defining the new path to that code state. That constitutes the most likely (survivor) trellis path to that code state. Finally, a traceback unit traces back along the accumulated survivor paths to thereby determine the sequence of bits constituting the most likely transmitted data sequence. The number of traceback steps is called the decoding depth, and the oldest bit on the traceback path is output as a decoded bit. The traceback unit must therefore store the aforesaid number of most recent traceback steps, which are in the form of pointers or "decision vectors."

In accordance with the aforesaid description, for every destination state (on the right side of FIG. 5A) the ACS unit must determine the appropriate branch metric to add to the already accumulated path metric going back to the preceding states that end in that destination state, and then select as the surviving path the one having the smallest resultant path metric.

Note that a description of the state transitions which result in the surviving path must be stored following each successive received symbol in a sequence. This consists of the accumulated path metric leading up to the present state, and also the precise sequence of transitions between all previous states in order to arrive at the present state. Clearly, it is impossible to store all possible transitions leading to a given state. A sub-optimal solution is to store all transitions up to a specified number of states preceding the present state. The trellis state transition corresponding to the pointer stored in the path memory unit (PMU) corresponding to the earliest branch which has resulted in the best metric among all the states existing at the current transition is then used to determine the decoded symbol. Such decoded symbol is described by identifying the pre-coded bit and also which of the subsets a, b, c, or d correspond to the encoded bit as described above. This trellis decoding strategy is well known and is described in the above-referenced textbook by Viterbi and also in a technical paper entitled "A Programmable Parallel Processor Architecture For A Viterbi Detector," by H. Lou et al., Globecom, 1990.

The transition history of each surviving path metric is stored in the path memory unit (PMU). A simplified implementation of the PMU which separates memory-based functions from logic functions thereof is described in a technical paper entitled "Memory Management in a Viterbi Decoder," by C. M. Rader, IEEE Trans. Comms., Vol. Com-29, No. 9, September 1981. Basically, the idea is to compute the past state transition sequence best corresponding to the present state. What then needs to be stored for every state is a selective pointer to the best corresponding previous state. These pointers can then be sequentially used to identify the selected branch at the earliest stage of the PMU and consequently the initial decoded symbol in the complete sequence.

Figure 6:
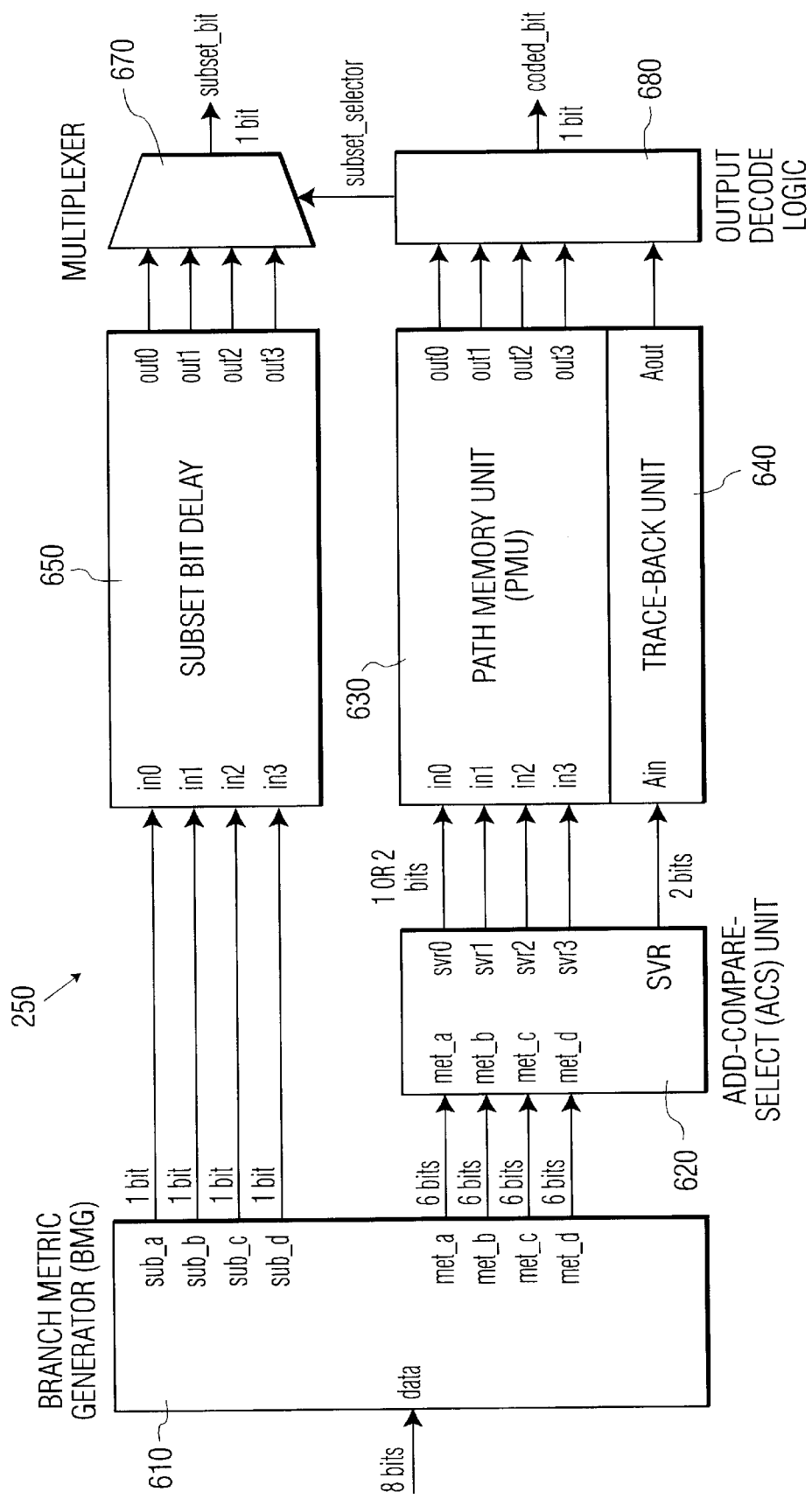
FIG. 6 illustrates a block diagram of an exemplary ATSC trellis decoder.

FIG. 6 illustrates a block diagram of an exemplary ATSC trellis decoder 250. Trellis decoder unit 250 comprises a branch metric generator (BMG) unit 610, an add-compare-select (ACS) unit 620, a path memory unit (PMU) 630, a traceback unit 640, and a subset bit delay unit 650. Trellis decoder unit 250 also comprises a subset bit multiplexer 670 and an output decode logic unit 680. The terms "met_a", "met_b", "met_c", and "met_d" in branch metric generator (BMG) unit 610 refer to a branch metric for the current input symbol corresponding to each subset (a, b, c, d). The terms "sub_a", "sub_b", "sub_c", and "sub_d" in branch metric generator (BMG) unit 610 refer to a subset (uncoded) bit for the current input symbol corresponding to each subset (a, b, c, d). The terms "svr0", "svr1", "svr2", and "svr3" in add-compare-select (ACS) unit 620 refer to a pointer to the previous trellis state for the survivor path corresponding to each possible current state. The term "SVR" in add-compare-select (ACS) unit 620 refers to the survivor path with the lowest cumulative metric. The pointers "svr0", "svr1", "svr2", and "svr3" to the previous state in each survivor path may be implemented using one (1) or two (2) bits each.

It is understood the component elements of trellis decoder unit 250 described herein are exemplary only, and that from the functional descriptions given herein it will be apparent to those skilled in the art that various logic circuit implementations of each of these component elements of trellis decoder unit 250 can be employed.

The input to the BMG unit 610 is a digitized baseband data symbol stream resulting from demodulation and detection of the transmitted eight (8) level VSB signal described above with reference to the digital receiver in FIG. 2. Each symbol in the stream, in the ideal case of perfect transmission with no channel distortion or noise, will be at one of the eight (8) discrete levels that make up the constellation of the 8-VSB demodulator, as shown by the symbol mapper 430 in FIG. 4. In reality, however, noise in the transmission channel affects the value of each symbol. If the noise is very low, the detected symbol value (three (3) bits) will be closer to the level of the actually transmitted symbol than to any of the other seven (7) levels, and so in principle could be obtained by simple eight (8) level slicing. If the noise level exceeds a certain value, however, the detected symbol level may be closer to an incorrect one of the eight (8) constellation values. It is under these conditions that trellis encoding, wherein the value of each encoded symbol depends on present as well as previous symbol values, achieves significant improvement of the receiver bit error rate.

Figure 7:
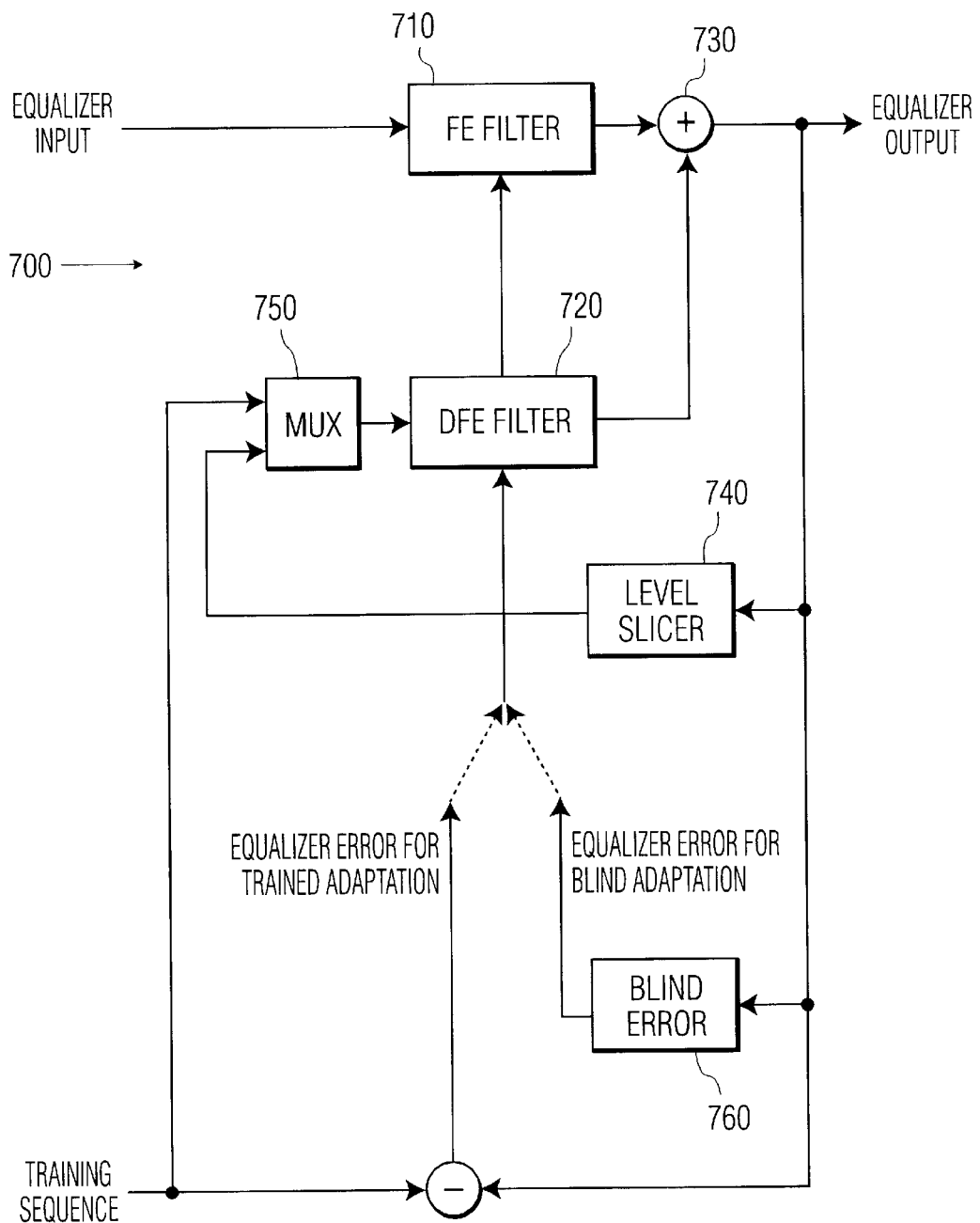
FIG. 7 illustrates a block diagram of an adaptive channel equalizer comprising a forward equalizer (FE) filter and a decision feedback equalizer (DFE) filter.

FIG. 7 illustrates a block diagram of a prior art adaptive channel equalizer 700 for use in equalizer and phase tracker unit 240. Prior art adaptive channel equalizer unit 700 comprises a forward equalizer (FE) filter 710 and a decision feedback equalizer (DFE) filter 720. The output from forward equalizer (FE) filter 710 is added to the output from decision feedback equalizer (DFE) filter 720 in adder unit 730 to form the output of adaptive channel equalizer unit 700.

Forward equalizer (FE) filter 710 accepts the uncompensated channel symbol data as its input. In contrast, decision feedback equalizer (DFE) filter 720 requires for its input an "estimate" of the symbol that was transmitted over the channel before the symbol was corrupted by noise.

As is well known, DFE filter 720 can receive an estimate of the output symbol by simply "slicing" the equalizer output. The term "slicing" refers to the process of taking the allowed symbol value (of the eight (8) levels specified by the 8-VSB ATSC Standard) that is nearest to that of the actual output. In the embodiment shown in FIG. 7, level slicer 740 provides the "sliced" symbols to DFE filter 720 through multiplexer 750. This method of providing estimates of the output symbols to DFE filter 720 can suffer from error propagation caused by slicing errors.

As is also well known, DFE filter 720 can be adapted either in a "trained mode" or in a "blind" mode. In the "trained mode" DFE filter 720 receives a "training sequence" of known symbols (through multiplexer 750) at a certain known time. DFE filter 720 compares the known training sequence with the "equalizer error for trained adaptation." The equalizer error for trained adaptation is obtained by subtracting the equalizer output from the known training sequence. DFE filter 720 then adjusts its operation to cause the equalizer output to match the known sequence of training signals.

Alternatively, DFE filter 720 can operate in a "blind mode." In the "blind mode" DFE filter 720 receives an "equalizer error for blind adaptation" from blind error unit 760. Blind error unit 760 compares the equalizer output with an expected statistical distribution of the data to generate the equalizer error blind adaptation. DFE filter 720 then adjusts its operation to cause the equalizer output to match the expected statistical distribution of the data.

Figure 8:
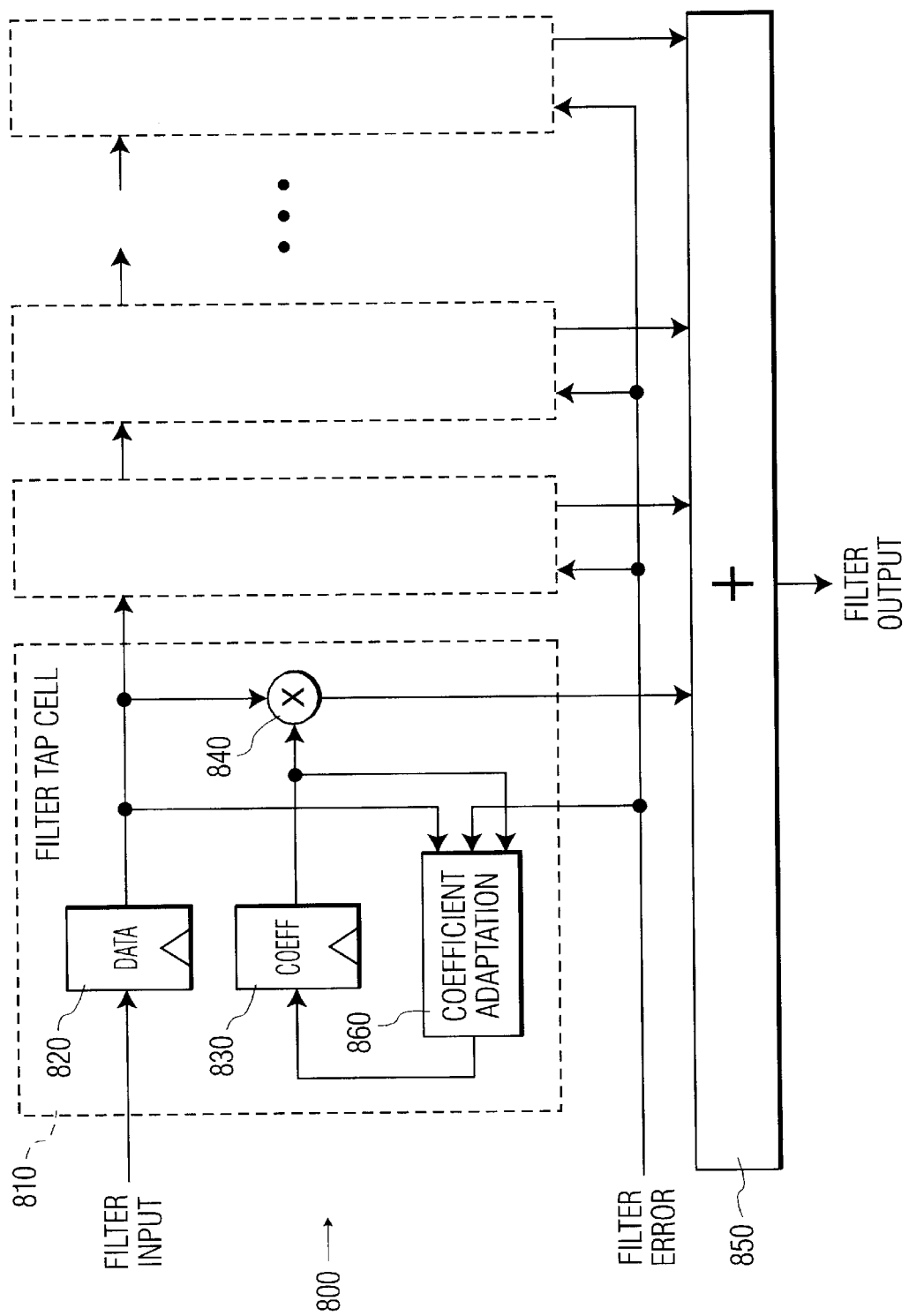
FIG. 8 illustrates a block diagram of an adaptive finite impulse response (FIR) filter for use in an adaptive channel equalizer.

FIG. 8 Illustrates a conventional adaptive finite impulse response (FIR) filter 800 for use in forward equalizer (FE) filter 710 and in decision feedback equalizer (DFE) filter 720. The coefficients of FIR filter 800 are computed to compensate as much as possible for channel distortions. The length of FIR filter 800 corresponds to the maximum impairment delay that FIR filter 800 is designed to correct for.

FIR filter 800 comprises a number of filter tap cells 810 (also referred to as "filter taps"). Each filter tap 810 comprises a data storage register 820, a coefficient storage register 830, and multiplier 840. The output of multiplier 840 is input to an adder unit 850. Adder unit 850 sums all of the weighted tap values to generate a filter output. Filter tap 810 also comprises a coefficient adaptation unit 860 that computes the updated filter coefficients. The coefficient adaptation unit 860 has the following inputs: (1) the current coefficient value, (2) the data tap value, and (3) a measure of the equalizer error (i.e., the difference between the expected signal value and the actual output signal value). The coefficient adaptation unit 860 operates only when the adaptation process is being performed.

A commonly used method of computing the filter coefficients uses the well known least mean square (LMS) algorithm. The LMS algorithm is a successive approximation technique that uses the current coefficient and data tap values as well as the equalizer error to compute the new coefficient value. The LMS algorithm repeats the procedure until each filter coefficient converges to the desired optimum value.

In a typical LMS algorithm the coefficient vector is determined using the following formula:

$$C_{n+1} = C_n + \mu E \, d_n \tag{2}$$

where $C_n$ is the coefficient vector at time n, $\mu$ is an adaptation speed constant, and $d_n$ is the data vector in the filter at time n. E is the error calculated from the output of the equalizer. E can be calculated in a decision directed fashion using the known training sequence embedded in the data stream. Alternatively, E can be calculated in a blind fashion using a CMA algorithm. The abbreviation CMA stands for "constant modulus algorithm."

Figure 9:
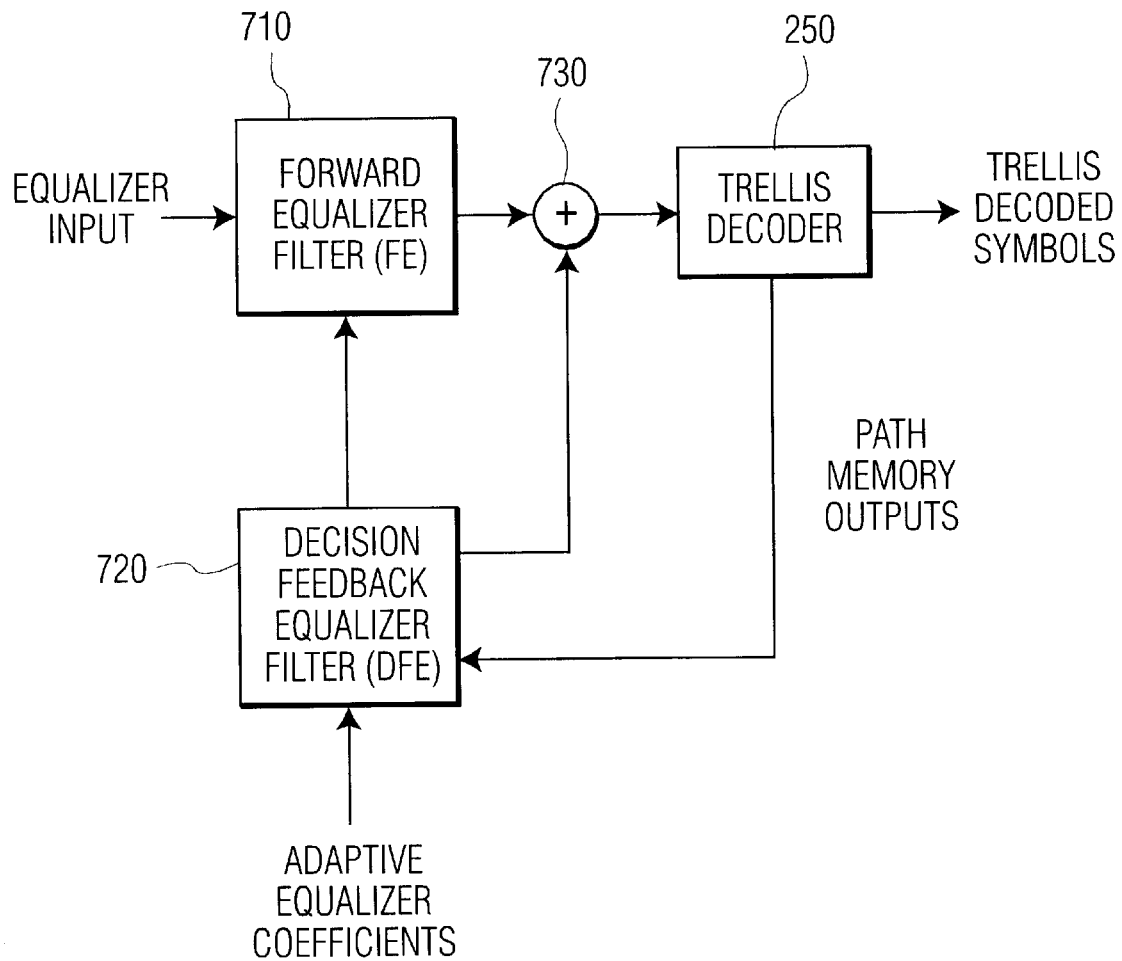
FIG. 9 illustrates a block diagram of the present invention showing the connection of a forward equalizer (FE) filter to a trellis decoder and the connection of the trellis decoder to a decision feedback equalizer (DFE) filter.

FIG. 9 illustrates a block diagram of the present invention showing the connection of forward equalizer (FE) filter 710 to trellis decoder 250 and the connection of trellis decoder 250 to decision feedback equalizer (DFE) filter 720. The output from forward equalizer (FE) filter 710 is added to the output from decision feedback equalizer (DFE) filter 720 in adder unit 730 to form the input to trellis decoder 250. The path memory outputs from trellis decoder 250 are fed back to decision feedback equalizer (DFE) filter 720. As will be more fully explained, information from the path memory outputs is used to reduce errors in decision feedback equalizer (DFE) filter 720.

The ATSC standard specifies a rate 1/2 code trellis decoder where the symbols are interleaved into twelve (12) different trellis decoders. The ATSC standard specifies path memory output lengths from twelve (12) symbols to sixteen (16) symbols. Thus, in presently available ATSC trellis decoder embodiments a path memory of twelve (12) to sixteen (16) delays is typically used before symbol decisions are made. When combined with the interleaving, the delay amounts to a latency of one hundred forty four (144) symbols (i.e., twelve (12) delays times twelve (12) symbols) to one hundred ninety two (192) symbols (i.e., sixteen (16) delays times twelve (12) symbols). With these latencies, the output of the trellis decoder is of little use to the decision feedback equalizer (DFE) filter.

However, in the present invention, after each path memory stage in trellis decoder 250, a "best guess" for each symbol can be generated that will have a lower probability of error than the "hard" decisions made on the eight (8) level equalizer output. These "best guesses" can be fed back into DFE filter 720 as soon as they are available.

Trellis decoder 250 simultaneously makes available the entire traceback path for one of the twelve (12) trellis coded data streams. In every stage of the traceback memory in trellis decoder 250 a branch metric and a survivor path are available from which a symbol can be decoded. The "best guess" for each symbol can serve as an improved "estimate" for the symbol to be provided to DFE filter 720.

Therefore, when the path memory length is sixteen (16), trellis decoder 250 can provide current information concerning the most recent sixteen (16) symbols. Information concerning the first (or earliest) symbol of the set of sixteen (16) symbols will be accurate because that symbol will have been fully decoded. The current information concerning the remaining fifteen (15) symbols of the set will not be as accurate as it will become after the remaining fifteen (15) symbols are fully decoded. But the current information concerning the remaining fifteen (15) symbols of the set will be more accurate than the information available from the "hard" slicer decisions available using prior art methods.

Figure 10:
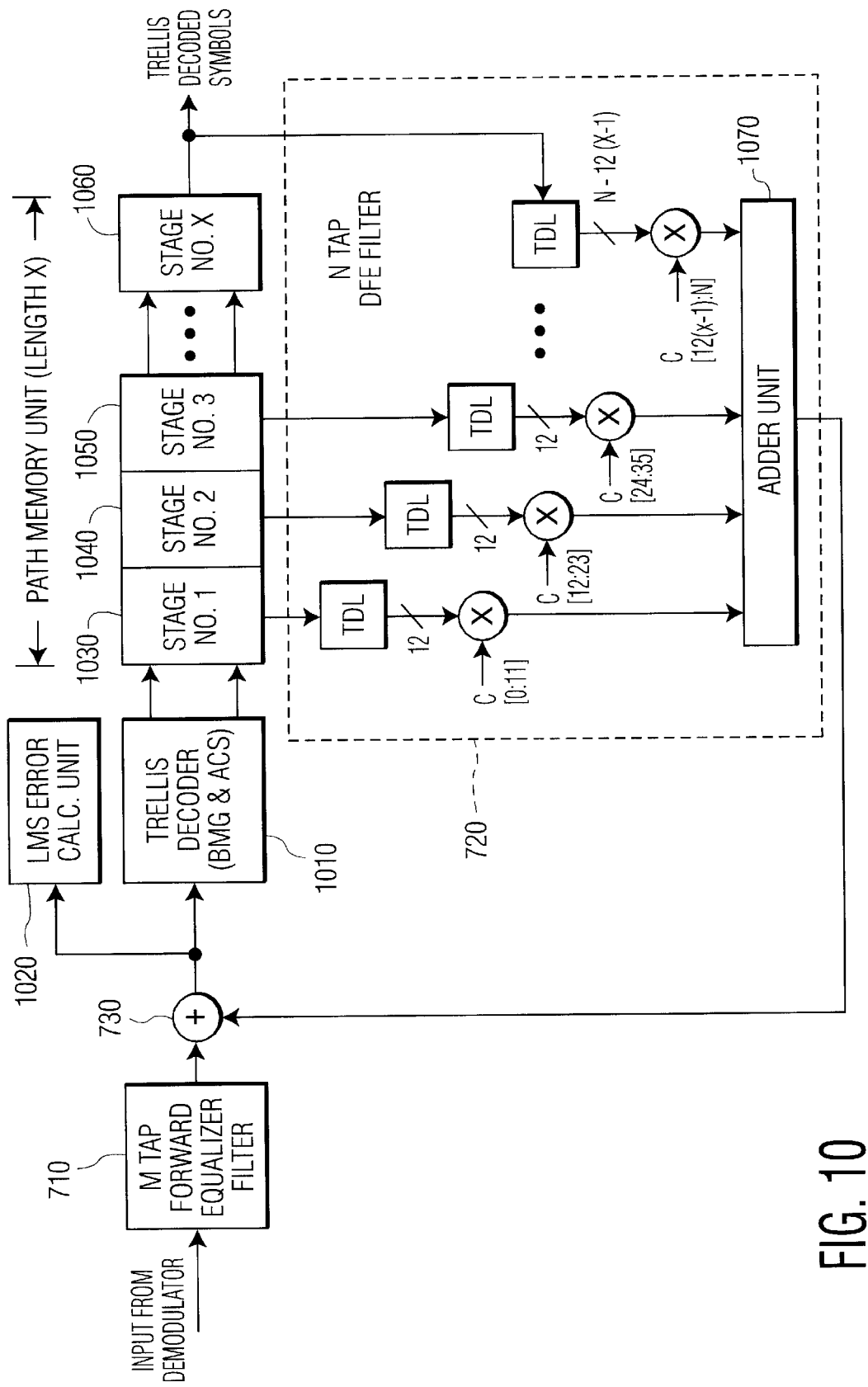
FIG. 10 illustrates a block diagram of the present invention showing in more detail the connection of the trellis decoder to the decision feedback equalizer (DFE) filter.

FIG. 10 illustrates a block diagram showing in more detail the connection of the trellis decoder 250 to the decision feedback equalizer (DFE) filter 720. Forward equalizer (FE) filter 710 is a filter having M taps. Decision feedback equalizer (DFE) filter 720 is an equalization filter having N taps. Branch metric generator (BMG) unit 610 and add-compare-select (ACS) unit 620 of trellis decoder 250 are shown in FIG. 10 as trellis decoder unit 1010.

As previously described, the output from forward equalizer (FE) filter 710 is added to the output from decision feedback equalizer (DFE) filter 720 in adder unit 730 to form the input to trellis decoder unit 1010. Least mean square (LMS) calculation unit 1020 also receives a copy of the input to trellis decoder unit 1010. Path memory unit (PMU) 630, traceback unit 640, and subset bit delay unit 650 are represented schematically in FIG. 10 as consecutive stages. In particular, the stages comprise stage number one (No. 1) 1030, stage number two (No. 2) 1040, stage number three (No. 3) 1050, . . . , and stage number X (No. X) 1060. In the ATSC standard, the value X typically takes on the values twelve (12) or sixteen (16).

As shown in FIG. 10, a path memory output from each of the X stages is connected to a tapped delay line (TDL) of N tap DFE filter 720. Each stage provides twelve (12) symbol inputs (one symbol input for every twelve (12) symbols for the ATSC standard). Each of the tapped delay lines (TDL) is coupled to a respective multiplier having respective data tap coefficients C [0:11], C [12:23], C [24:35], . . . , C [12(X-1):N]. The outputs of the respective multipliers are summed in adder unit 1070. The output of the adder unit 1070 is fed back to adder unit 730.

In this manner, N tap DFE filter 720 receives an improved estimate or "best guess" for each symbol in the trellis decoder symbol stream. The improved estimate has a lower probability of error than the "hard" slicer decisions available using prior art methods.

It is necessary that trellis decoder 250 be capable of providing the entire survivor path that corresponds to the current input symbol. In particular, the sequence of symbols that constitute this path will be fed back to DFE filter 720. The sequence of symbols can be reconstructed from the state transition and uncoded bit information stored in the corresponding path memories.

Figure 11:
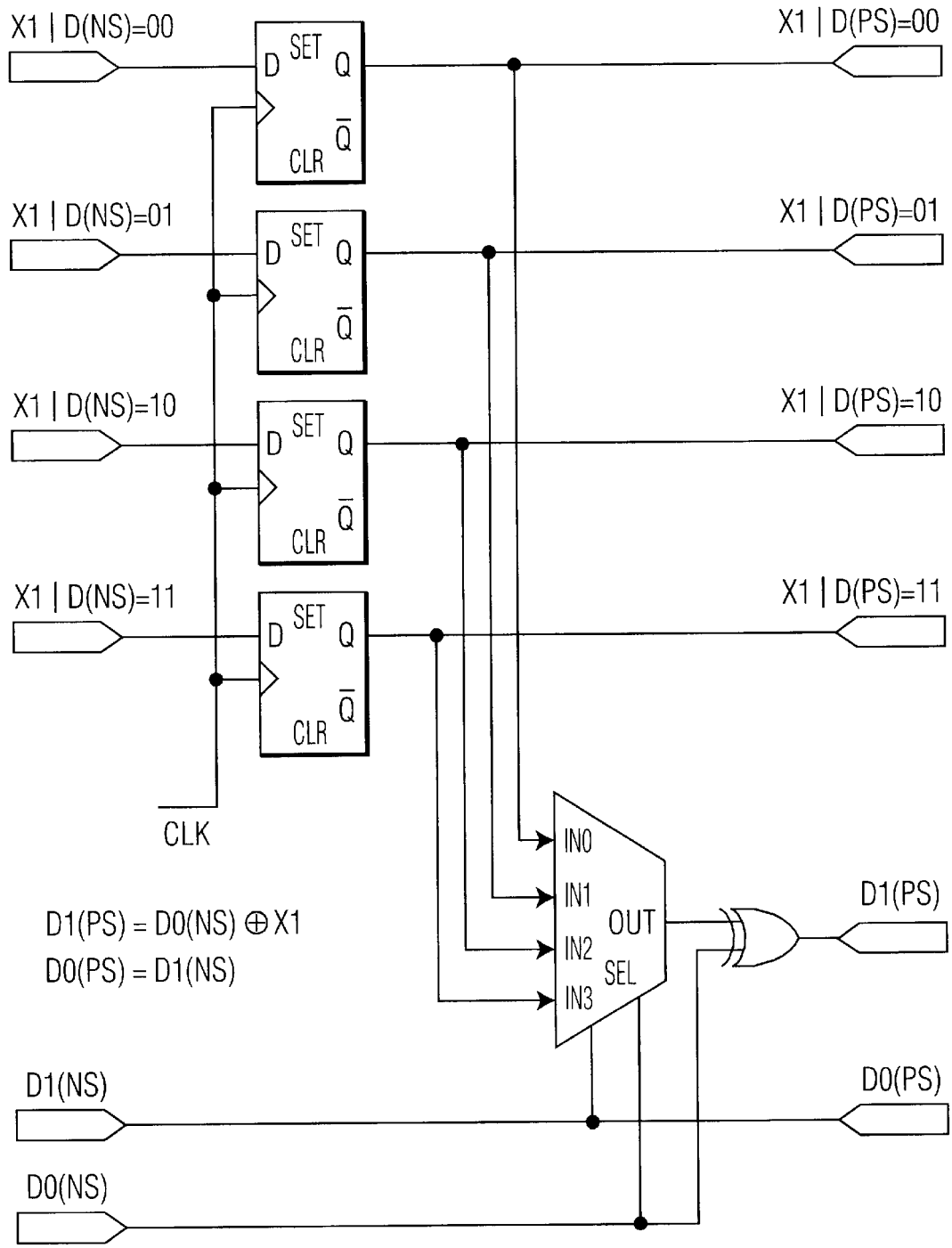
FIG. 11 illustrates a block diagram of an exemplary traceback logic unit of an ATSC trellis decoder.
Figure 12:
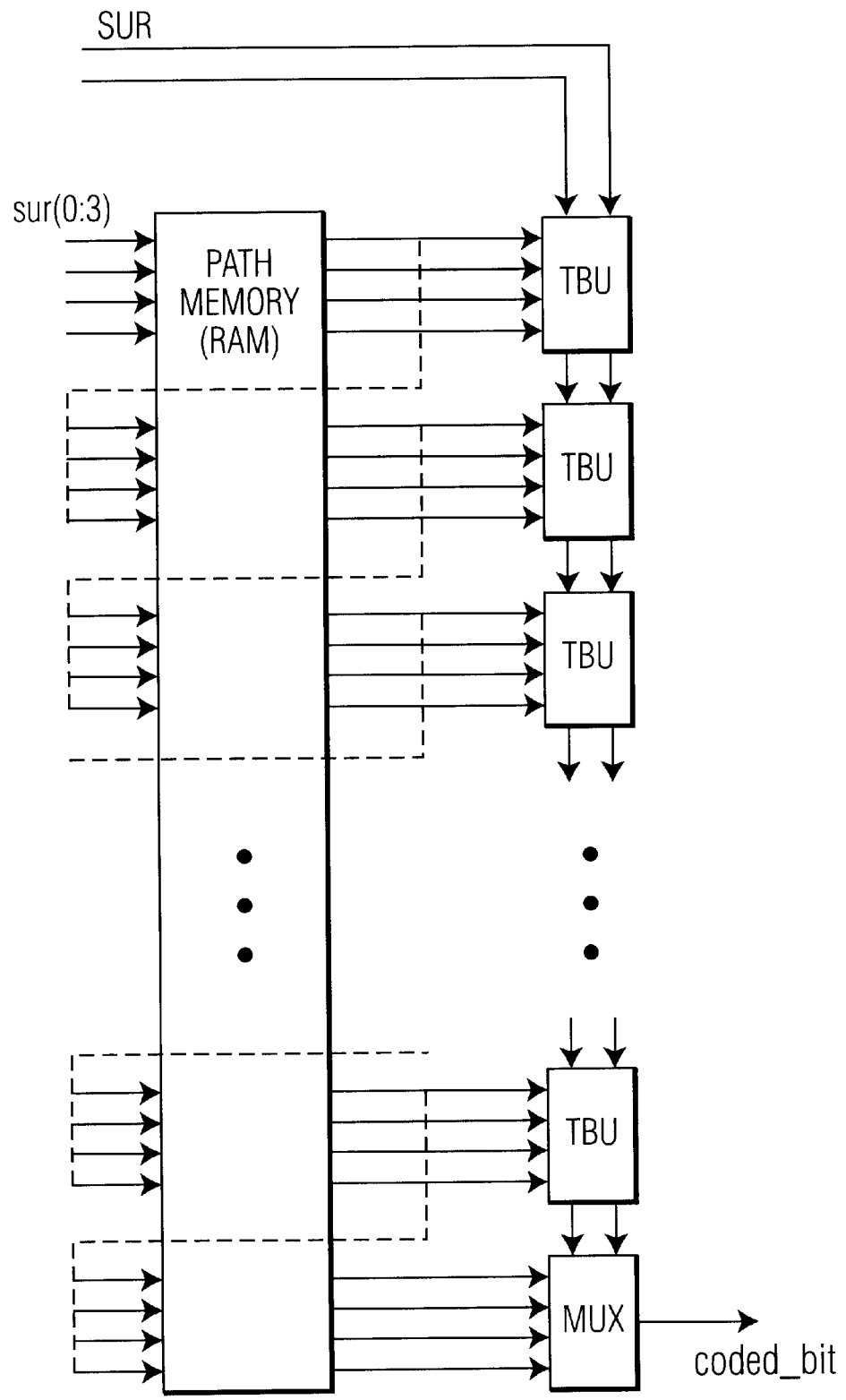
FIG. 12 illustrates a block diagram of an exemplary random access memory (RAM) implementation of a path memory unit (PMU) of an ATSC trellis decoder.

FIG. 11 illustrates a block diagram of an exemplary traceback logic unit for path memory unit 630 and traceback unit 640 of trellis decoder 250. FIG. 12 illustrates a block diagram of an exemplary random access memory (RAM) implementation of path memory unit 630 of trellis decoder 250. U.S. Pat. No. 6,141,384 by Wittig et al. entitled "Decoder for Trellis Encoded Interleaved Data Stream and HDTV Receiver Including Such a Decoder" issued Oct. 31, 2000 sets forth a detailed description of the operation of the traceback logic unit shown in FIG. 11 and the RAM implementation of the path memory unit shown in FIG. 12. U.S. Pat. No. 6,141,384 is assigned to the assignee of the present invention. The disclosures in U.S. Pat. No. No. 6,141,384 are hereby incorporated by reference in this patent application document as if fully set forth herein.

Figures 5B, 5C:
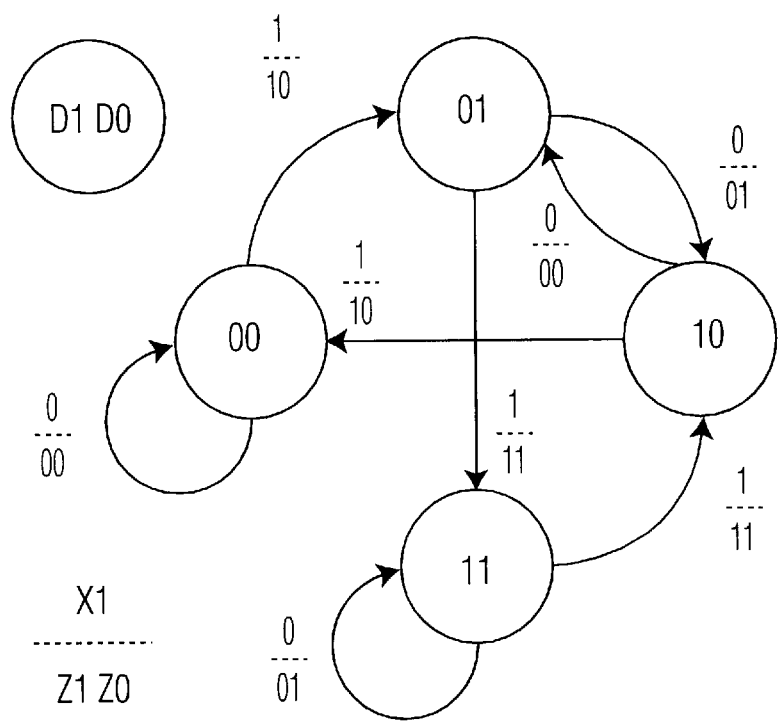
Figure 13:
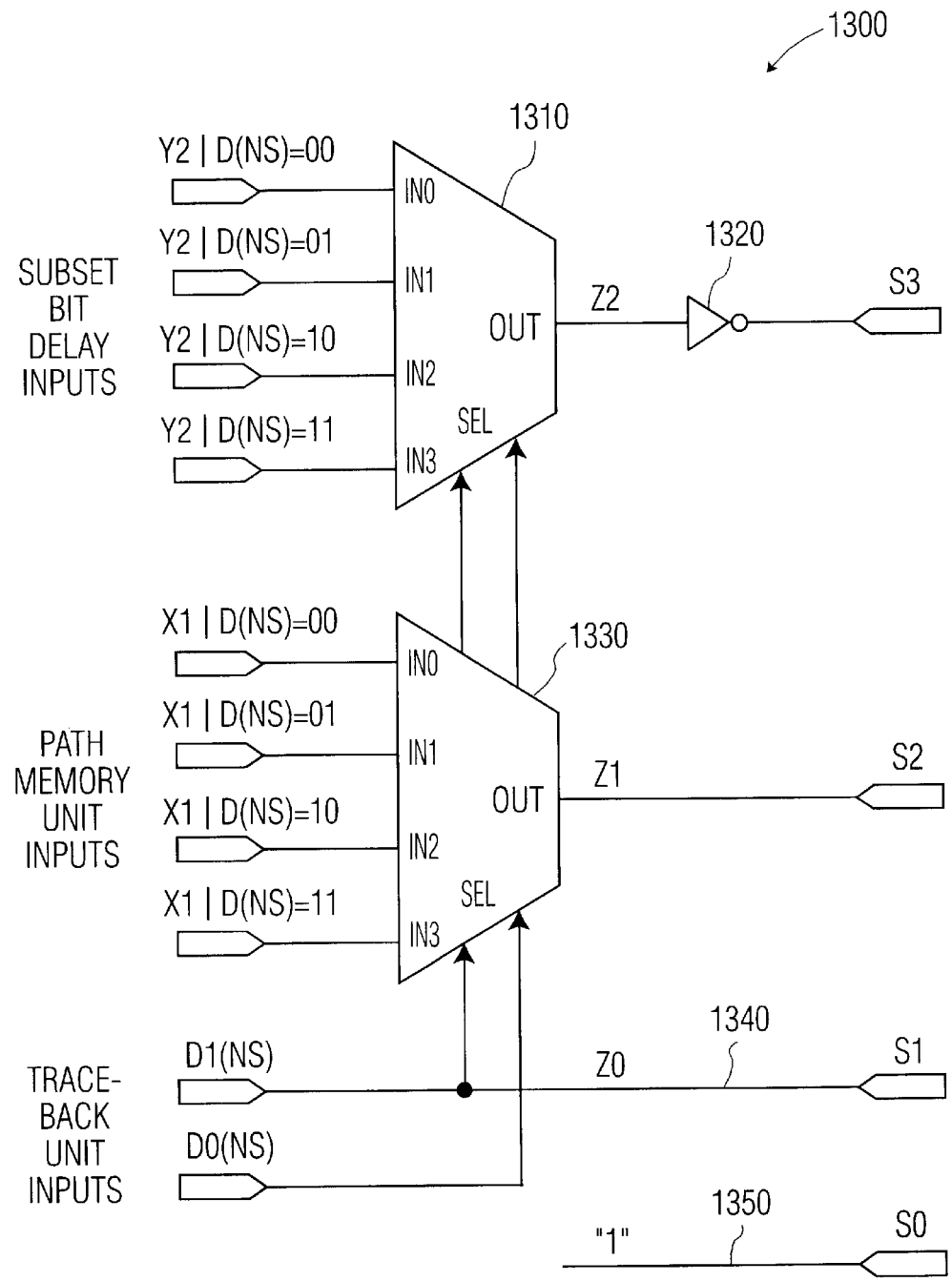
FIG. 13 illustrates a block diagram of data signal selection circuitry of the present invention capable of reconstructing the symbol stream for the survivor path of an ATSC trellis decoder.

The reconstruction of the symbol data from trace back information can be determined by referring to the ATSC trellis encoder block diagram in FIG. 4 and to the ATSC trellis code state diagrams shown in FIG. 5A, in FIG. 5B, and in FIG. 5C. FIG. 13 illustrates an advantageous embodiment of a data signal selection circuitry 1300 of the present invention for reconstructing the symbol stream for the survivor path. The reconstructed symbol stream will be used as the data for decision feedback equalizer (DFE) unit 720.

As shown in FIG. 13, the most significant bit of the reconstructed symbol is the "sign" bit (i.e., $S_3$). The "sign" bit is just the inverse of the uncoded data bit (i.e., $Y_2$ or $Z_2$). Multiplexer 1310 receives selection input signals from the trace back unit inputs $D_1$ and $D_0$. Multiplexer 1310 selects one of the four $Y_2$ input signals and outputs the selected signal as $Z_2$. Inverter 1320 provides an inverse of the signal $Z_2$ as the "sign" bit $S_3$.

The second most significant bit of the reconstructed symbol (i.e., $S_2$) is the coded data bit ($Y_1$ or $Z_1$). Multiplexer 1330 receives selection input signals from the trace back unit inputs $D_1$ and $D_0$. Recall that $X_1$ and $Y_1$ and $Z_1$ represent the same signal. Multiplexer 1330 selects one of the four $X_1$ input signals and outputs the selected signal as $Z_1$. Signal $Z_1$ is output as bit $S_2$.

The second least significant bit of the reconstructed symbol (i.e., $S_1$) is the most significant bit ($D_1$) of the next state variable. Here no multiplexer is needed. Signal $D_1$ (or $Z_0$) is directly output as bit $S_1$ on trace back unit input line 1340.

Finally, the least significant bit of the reconstructed symbol ($S_0$) is set equal to one ("1") on input line 1350 (i.e., it is "hard-wired"), because the symbol value is always odd. The four bits ($S_0, S_1, S_2, S_3$) that represent the reconstructed symbol may be retrieved in this manner.

The actual feedback of the survivor path symbol data sequence to decision feedback equalizer (DFE) unit 720 is complicated by the fact that, in the ATSC standard, a segment synchronization pattern having a duration of four (4) symbols is transmitted at the beginning of every data segment of eight hundred thirty two (832) symbols. During this period, the operation of the equalizer proceeds in the normal manner (i.e., it treats these four (4) symbols as it does any other symbols). However, during this period, the operation of trellis decoder 250 is suspended. This means that (1) the survivor path symbol that is fed back to a given point in the decision feedback equalizer (DFE) data path at a given point in time is not necessarily from the same stage of the trace back path, and that (2) the required symbol may also be one of the four (4) that constitutes the segment sync pattern.

This initially appears to complicate the feedback of the survivor path symbol sequence to the decision feedback equalizer (DFE) unit 720 to such an extent as to make this approach impractical. In the ATSC standard, however, the actual trellis encoding process is stopped during the segment sync period but the interleaving multiplex process is not stopped. In particular, even though all twelve (12) trellis encoders completely suspend all operations during this period, the interleaving multiplexer will advance by four (4) symbols.

This means that if the last symbol transmitted before the segment sync pattern was from trellis encoder number twelve (i.e., trellis encoder 320L), then the first symbol transmitted after the segment sync pattern will be from trellis encoder number five (i.e., trellis encoder 320E) and not from trellis encoder number one (i.e., trellis encoder 320A).

Similarly, if the last symbol transmitted before the segment sync pattern was from trellis encoder number eight (i.e., trellis encoder 320H), then the first symbol transmitted after the segment sync pattern will be from trellis encoder number one (i.e., trellis encoder 320A) and not from trellis encoder number nine (i.e., trellis encoder 320I).

Also similarly, if the last symbol transmitted before the segment sync pattern was from trellis encoder number four (i.e., trellis encoder 320D), then the first symbol transmitted after the segment sync pattern will be from trellis encoder number nine (i.e., trellis encoder 320I) and not from trellis encoder number five (i.e., trellis encoder 320E).

These observations imply that, for a given point in the decision feedback equalizer (DFE) data path, the survivor path symbol that must be fed back is not necessarily from the same stage in the trace back path, but it must be from the same interleaved trellis encoder stream. As will be shown, this feature permits a significant simplification to be made.

It is also noted that the segment sync patterns occur only once each eight hundred thirty two (832) symbols. Consequently, if the path latency of the outputs of trellis decoder 250 is less than this number, then there will be at most one segment sync pattern in the decision feedback equalizer (DFE) path. As a result, the symbol that is the survivor path symbol that is fed back to a given point in the decision feedback equalizer (DFE) path must come from one of only two possible trace back stages. The remaining possibility is that the input symbol required at this point is from the segment sync pattern itself, which consists of only two symbol values (i.e., +5 and −5). Therefore, in this method there are only four possible symbols that need to be input to any given point in the decision feedback equalizer (DFE) data path.

A further simplification results from the fact that, at any given time, the trellis decoder system is operating on only one of the twelve trellis streams. Because adjacent symbols in the survivor path are actually separated from each other by twelve symbols in the interleaved trellis encoder stream, this means that only one of every twelve points in the decision feedback equalizer (DFE) data path require feedback. The remaining eleven points in the decision feedback equalizer (DFE) data path operate in the conventional "shift register" mode typically employed in a finite impulse response (FIR) filter.

If the length of decision feedback equalizer (DFE) unit 720 is less than twelve times the trace back path length, it is only necessary to feed back as many reconstructed symbols as the decision feedback equalizer (DFE) unit 720 requires. If it is greater than this number, the decision feedback equalizer (DFE) data taps that exceed it in delays must operate in the "shift register" mode.

Figure 14:
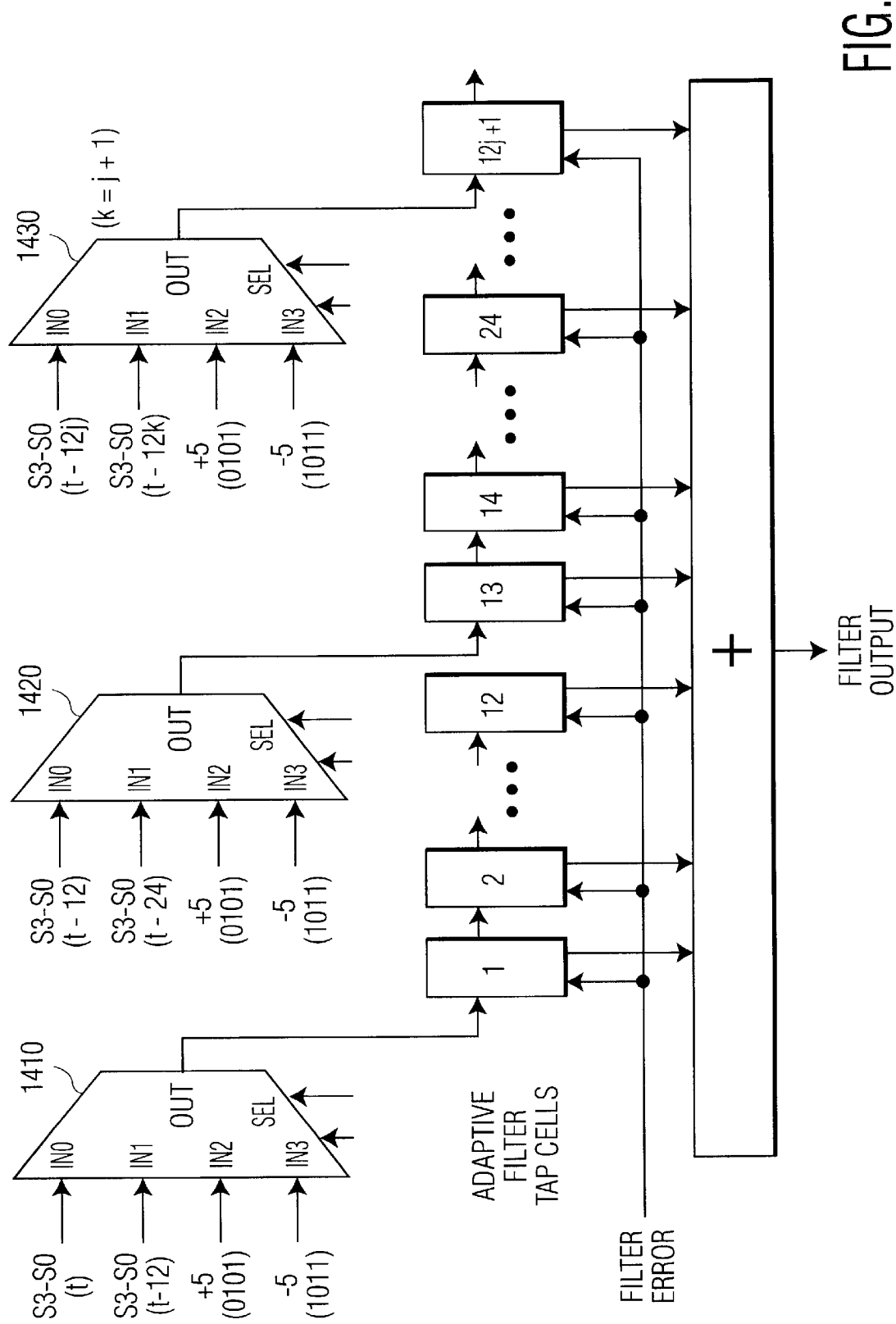
FIG. 14 illustrates a block diagram of a logic circuit of the present invention capable of providing the reconstructed symbol stream for the survivor path to a decision feedback equalizer (DFE) unit.

FIG. 14 illustrates an advantageous embodiment of a logic circuit of the present invention for providing the reconstructed symbol stream for the survivor path to decision feedback equalizer (DFE) unit 720. The control logic for the data multiplexers is defined by the data field and segment structure specified by the ATSC standard, and can be readily designed by any person having ordinary skill in the art.

As shown in FIG. 14, multiplexer 1410 receives four (4) inputs. The first input (IN0) is a signal that represents the symbol (bits $S_3$ through $S_0$) that is present at trellis point "t." The second input (IN1) is a signal that represents the symbol (bits $S_3$ through $S_0$) that is present at trellis point "t−12." The third input (IN2) is a signal that represents the number "plus five" (+5 decimal or 0101 binary). The fourth input (IN3) is a signal that represents the number "minus five" (−5 decimal or 1011 binary). Multiplexer 1410 receives selection input signals from the control logic. Multiplexer 1410 selects one of the four input signals and outputs the selected signal to the first adaptive filter tap cell (i.e., cell one (1)) in a first set of twelve (12) adaptive filter tap cells (i.e., cell one (1) through cell twelve (12)).

Similarly, multiplexer 1420 receives four (4) inputs. The first input (IN0) is a signal that represents the symbol (bits $S_3$ through $S_0$) that is present trellis point "t−12." The second input (IN1) is a signal that represents the symbol (bits $S_3$ through $S_0$) that is present at trellis point "t−24." The third input (IN2) is a signal that represents the number "plus five" (+5 decimal or 0101 binary). The fourth input (IN3) is a signal that represents the number "minus five" (−5 decimal or 1011 binary). Multiplexer 1420 receives selection input signals from the control logic. Multiplexer 1420 selects one of the four input signals and outputs the selected signal to the first adaptive filter tap cell (i.e., cell thirteen (13)) in a second set of twelve (12) adaptive filter tap cells (i.e., cell thirteen (13) through cell twenty four (24)).

The logic circuit of the present invention shown in FIG. 14 continues similarly for each set of twelve adaptive filter tap cells. Generally, multiplexer 1430 receives four (4) inputs. The first input (IN0) is a signal that represents a symbol (bits $S_3$ through $S_0$) that is present at trellis point "t−12j" where j may take integer values from zero ("0") up to X−1. The second input (IN1) is a signal that represents the symbol (bits $S_3$ through $S_0$) that is present at trellis point "t−12k" where k may take integer values equal to the sum of j plus one ("j+1"). The third input (IN2) is a signal that represents the number "plus five" (+5 decimal or 0101 binary). The fourth input (IN3) is a signal that represents the number "minus five" (−5 decimal or 1011 binary). Multiplexer 1430 receives selection input signals from the control logic. Multiplexer 1430 selects one of the four input signals and outputs the selected signal to a first adaptive filter tap cell (i.e., cell (12j+1)) in a general set of twelve (12) adaptive filter tap cells (i.e., cell (12j+1) through cell (12j+12)).

Figure 15:
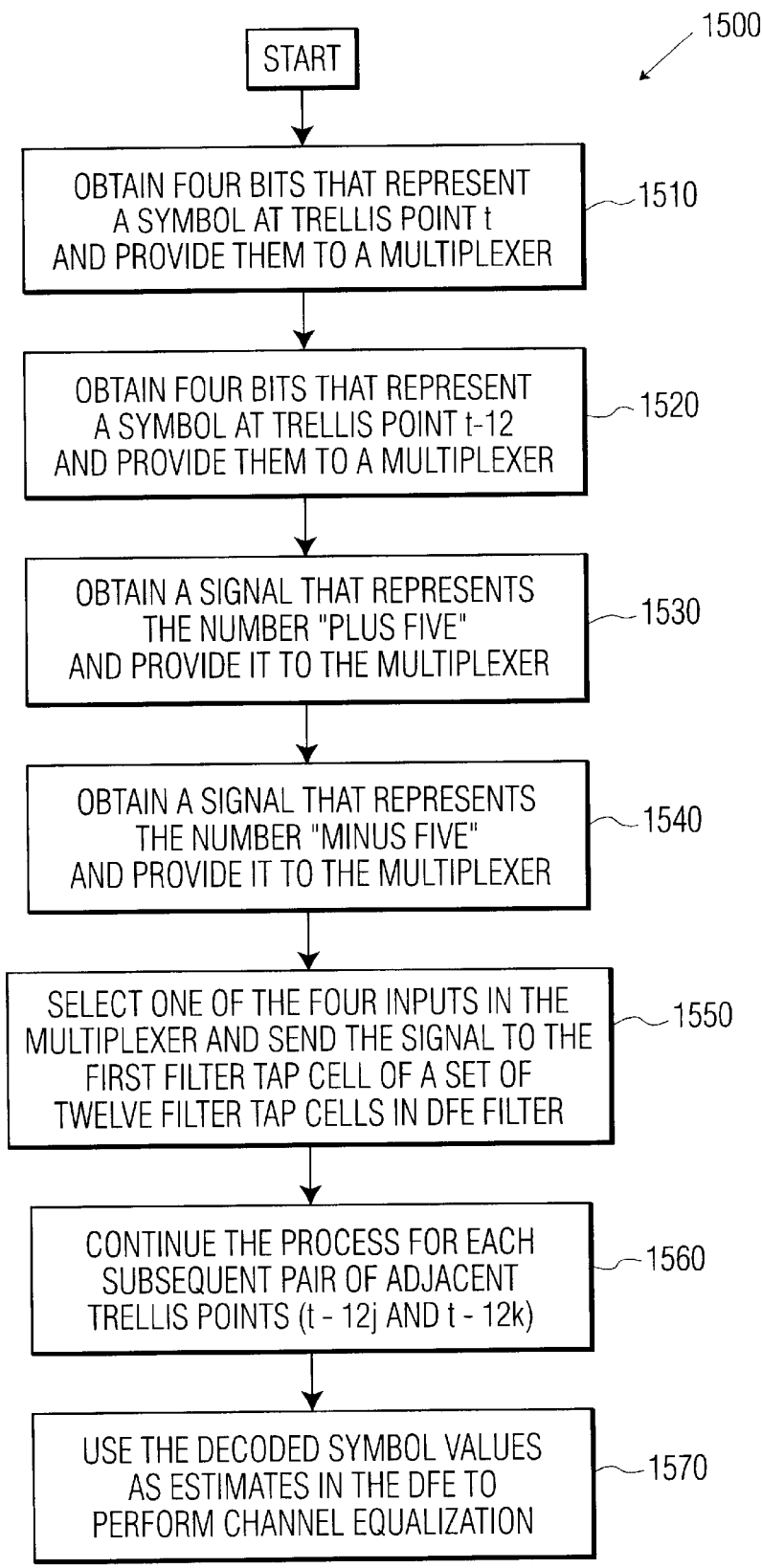
FIG. 15 illustrates a flow diagram showing an advantageous embodiment of the method of the present invention.

FIG. 15 illustrates a flow diagram showing an advantageous embodiment of the method of the present invention. The steps of the method are collectively referred to with the reference numeral 1500. From trellis decoder 250 four bits ($S_0$, $S_1$, $S_2$, $S_3$) are obtained that represent a reconstructed symbol in a symbol stream at trellis point "t" and are provided as a first input to multiplexer 1410 (step 1510). From trellis decoder 250 four bits ($S_0$, $S_1$, $S_2$, $S_3$) are obtained that represent a reconstructed symbol in a symbol stream at trellis point "t−12" and are provided to a second input of multiplexer 1410 (step 1520). A signal that represents the number "plus five" is provided to a third input of multiplexer 1410 (step 1530). A signal that represents the number "minus five" is provided to a fourth input of multiplexer 1410 (step 1540).

In response to receiving selection input signals from the control logic, multiplexer 1410 selects one of the four input signals and outputs the selected signal to the first filter tap cell of a set of twelve (12) adaptive filter tap cells in a decision feedback equalizer (step 1550). The method of the invention continues the process for each subsequent pair of adjacent trellis points (t−12j and t−12k) (step 1560). Decision feedback equalizer unit 720 uses the decoded symbol values as estimates to perform channel equalization (step 1570).

While the present invention has been described in detail with respect to certain embodiments thereof, those skilled in the art should understand that they can make various changes, substitutions modifications, alterations, and adaptations in the present invention without departing from the concept and scope of the invention in its broadest form.

What is claimed is:

1. An apparatus for reconstructing symbol values from trace back path information stored within a trellis decoder, said apparatus being part of a receiver configured for decoding trellis encoded signals, the receiver comprising: said trellis decoder and a decision feedback equalizer coupled to each path memory output of said trellis decoder, wherein said decision feedback equalizer is of configured for obtaining symbol values from each path memory output of said trellis decoder for use as estimates in channel equalization, said apparatus comprising data signal selection circuitry for obtaining values for four bits, $S_3$, $S_2$, $S_1$, $S_0$, that represent a reconstructed symbol, a value for $S_3$ representing the most significant bit of said reconstructed symbol, wherein said data signal selection circuitry comprises: a multiplexer having four inputs where each of said four inputs provides a subset bit delay input value, said multiplexer configured for selecting one of said four input values as signal $Z_2$ in response to selection input signals from trace back unit inputs $D_1$ and $D_0$; and an inverter coupled to an output of said multiplexer, said inverter configured for providing an inverse of signal $Z_2$ as signal $S_3$.

2. The apparatus as claimed in claim 1 wherein said apparatus comprises data signal selection circuitry for obtaining a value for bit $S_2$ that represents the second most significant bit of said reconstructed symbol, wherein said data signal selection circuitry comprises: a multiplexer having four inputs where each of said four inputs provides a path memory unit input value, said multiplexer configured for selecting one of said four input values as signal $Z_1$ in response to selection input signals from trace back unit inputs $D_1$ and $D_0$, and configured for providing signal $Z_1$ as signal $S_2$.

3. The apparatus as claimed in claim 1 wherein said apparatus comprises data signal selection circuitry for obtaining a value for bit $S_1$ that represents the second least significant bit of said reconstructed symbol, wherein said data signal selection circuitry comprises: a trace back unit input line providing a trace back unit input value $D_1$, said trace back unit input line configured for providing signal $D_1$ as signal $S_1$.

4. The apparatus as claimed in claim 1 wherein said apparatus comprises data signal selection circuitry for obtaining a value for bit $S_0$ that represents the least significant bit of said reconstructed symbol, wherein said data signal selection circuitry comprises: an input line providing a constant input value of one for signal $S_0$.

5. For use in a receiver configured for decoding trellis encoded signals of the type comprising: a trellis decoder and a decision feedback equalizer coupled to each path memory output of said trellis decoder, wherein said decision feedback equalizer is configured for obtaining symbol values from each path memory output of said trellis decoder for use as estimates in channel equalization, an apparatus for providing to said decision feedback equalizer a reconstructed symbol stream from said trellis decoder, said apparatus comprising: at least one multiplexer having four symbol value inputs, wherein said at least one multiplexer is configured for selecting one of said four symbol value inputs in response to control logic signals; and wherein said at least one multiplexer is configured for sending a selected symbol value to an adaptive filter tap cell in said decision feedback equalizer.

6. The apparatus as claimed in claim 5 wherein said four symbol value inputs to said at least one multiplexer comprise: a first symbol that is present at trellis point "t"; a second symbol that is present at trellis point "t−12"; a third symbol having the value "plus five"; and a fourth symbol having the value "minus five".

7. The apparatus as claimed in claim 6 wherein said at least one multiplexer is configured for sending a selected symbol value to a first adaptive filter tap cell in a set of twelve adaptive filter tap cells in said decision feedback equalizer.

8. The apparatus as claimed in claim 5 wherein said apparatus comprises a plurality of multiplexers, wherein each multiplexer in said plurality of multiplexers has four symbol value inputs; and wherein each multiplexer of said plurality of multiplexers is configured for selecting one of said four symbol value inputs in response to control logic signals.

9. The apparatus as claimed in claim 8 wherein said four symbol value inputs to each multiplexer of said plurality of multiplexers comprise: a first symbol that is present at trellis point "t−12j"; a second symbol that is present at trellis point "t−12k"; a third symbol having the value "plus five"; and a fourth symbol having the value "minus five" where j may take integer values from zero up to the value X minus 1 where X is the number of stages in said trellis decoder, and where k may take integer values equal to the sum of j plus one.

10. The apparatus as claimed in claim 9 wherein each multiplexer of said plurality of multiplexers is configured for sending a selected symbol value to a respective first adaptive filter tap cell in one of a plurality of sets of twelve of adaptive filter tap cells, where each set of said plurality of twelve adaptive filter tap cells comprises twelve cells from cell 12j+1 through cell 12j+12, where j may take integer values from zero up to the value X minus 1 where X is the number of stages in said trellis decoder.

11. A high definition television receiver configured for decoding trellis encoded signals comprising:

a trellis decoder; and a decision feedback equalizer coupled to each path memory output of said trellis decoder, wherein said decision feedback equalizer is configured for obtaining symbol values from each path memory output of said trellis decoder for use as estimates in channel equalization, said high definition television receiver comprising an apparatus for reconstructing symbol values from trace back path information stored within said trellis decoder, said apparatus comprising data signal selection circuitry for obtaining values for four bits, $S_3$, $S_2$, $S_1$, $S_0$, that represent a reconstructed symbol, said apparatus comprising data signal selection circuitry for obtaining a value for bit $S_3$ that represents the most significant bit of said reconstructed symbol, wherein said data signal selection circuitry comprises: a multiplexer having four inputs where each of said four inputs provides a subset bit delay input value, said multiplexer configured for selecting one of said four input values as signal $Z_2$ in response to selection input signals from trace back unit inputs $D_1$ and $D_0$; and an inverter coupled to an output of said multiplexer, said inverter configured for providing an inverse of signal $Z_2$ as signal $S_3$.

12. The high definition television receiver as claimed in claim 11 wherein said apparatus comprises data signal selection circuitry for obtaining a value for bit $S_2$ that represents the second most significant bit of said reconstructed symbol, wherein said data signal selection circuitry comprises: a multiplexer having four inputs where each of said four inputs provides a path memory unit input value, said multiplexer configured for selecting one of said four input values as signal $Z_1$ in response to selection input signals from trace back unit inputs $D_1$ and $D_0$, and configured for providing signal $Z_1$ as signal $S_2$.

13. The high definition television receiver as claimed in claim 11 wherein said apparatus comprises data signal selection circuitry for obtaining a value for bit $S_1$ that represents the second least significant bit of said reconstructed symbol, wherein said data signal selection circuitry comprises: a trace back unit input line providing a trace back unit input value $D_1$, said trace back unit input line configured for providing signal $D_1$ as signal $S_1$.

14. The high definition television receiver as claimed in claim 11 wherein said apparatus comprises data signal selection circuitry for obtaining a value for bit $S_0$ that represents the least significant bit of said reconstructed symbol, wherein said data signal selection circuitry comprises: an input line providing a constant input value of one for signal $S_0$.

15. A high definition television receiver configured for decoding trellis encoded signals comprising:
a trellis decoder; and
a decision feedback equalizer coupled to each path memory output of said trellis decoder, wherein said decision feedback equalizer is configured for obtaining symbol values from each path memory output of said trellis decoder for use as estimates in channel equalization, said high definition television receiver comprising an apparatus for providing to said decision feedback equalizer a reconstructed symbol stream from said trellis decoder, said apparatus comprising at least one multiplexer having four symbol value inputs, wherein said at least one multiplexer is configured for selecting one of said four symbol value inputs in response to control logic signals; and wherein said at least one multiplexer is configured for sending a selected symbol value to an adaptive filter tap cell in said decision feedback equalizer.

16. The high definition television receiver as claimed in claim 15 said four symbol value inputs to said at least one multiplexer comprise: a first symbol that is present at trellis point "t"; a second symbol that is present at trellis point "t−12"; a third symbol having the value "plus five"; and a fourth symbol having the value "minus five".

17. The high definition television receiver as claimed in claim 16 wherein said at least one multiplexer is configured for sending a selected symbol value to a first adaptive filter tap cell in a set of twelve adaptive filter tap cells in said decision feedback equalizer.

18. The high definition television receiver as claimed in claim 15 wherein said apparatus comprises a plurality of multiplexers, wherein each multiplexer in said plurality of multiplexers has four symbol value inputs; and wherein each multiplexer of said plurality of multiplexers is configured for selecting one of said four symbol value inputs in response to control logic signals.

19. The high definition television receiver as claimed in claim 18 said four symbol value inputs to each multiplexer of said plurality of multiplexers comprise: a first symbol that is present at trellis point "t−12j"; a second symbol that is present at trellis point "t−12k"; a third symbol having the value "plus five"; and a fourth symbol having the value "minus five" where j may take integer values from zero up to the value X minus 1 where X is the number of stages in said trellis decoder, and where k may take integer values equal to the sum of j plus one.

20. The high definition television receiver as claimed in claim 19 wherein each multiplexer of said plurality of multiplexers is configured for sending a selected symbol value to a respective first adaptive filter tap cell in one of a plurality of sets of twelve adaptive filter tap cells, where each set of said plurality of twelve adaptive filter tap cells comprises twelve cells from cell 12j+1 through cell 12j+12, where j may take integer values from zero up to the value X minus 1 where X is the number of stages in said trellis decoder.

21. For use in a receiver configured for decoding trellis encoded signals comprising a trellis decoder and a decision feedback equalizer coupled to each path memory output of said trellis decoder, wherein said decision feedback equalizer is configured for obtaining symbol values from each path memory output of said trellis decoder for use as estimates in channel equalization, a method for providing to said decision feedback equalizer a preconstructed symbol stream from said trellis decoder, said method comprising the steps of:
obtaining a first set of four bits that represents a reconstructed symbol at trellis point "t"; providing said first set of four bits to a first input of a multiplexer; obtaining a second set of four bits that represents a reconstructed symbol at trellis point "t−12"; providing said second set of four bits to a second input of said multiplexer; providing to a third input of said multiplexer a third set of bits that represents the number "plus five"; providing to a fourth input of said multiplexer a fourth set of bits that represents the number "minus five"; and selecting one of said four sets of bits in said multiplexer.

22. The method as claimed in claim 21 further comprising the steps of: sending said selected set of bits from said multiplexer to a first adaptive filter tap cell in a set of twelve adaptive filter tap cells of said decision feedback equalizer; and reconstructing a symbol stream from said trellis decoder using symbols obtained from said set of twelve adaptive filter tap cells.

23. The method as claimed in claim 21 further comprising the steps of:
obtaining a first set of four bits that represents a reconstructed symbol at trellis point "t−12j" where j may take integer values from zero up to the value X minus 1 where X is the number of stages in said trellis decoder;
providing said first set of four bits representing a reconstructed symbol at trellis point "t−12j" to a first input of a multiplexer;
obtaining a second set of four bits that represents a reconstructed symbol at trellis point "t−12k" where k may take integer values equal to the sum of j plus one;
providing said second set of four bits representing a reconstructed symbol at trellis point "t−12k" to a second input of said multiplexer;
providing to a third input of said multiplexer a third set of bits that represents the number "plus five";
providing to a fourth input of said multiplexer a fourth set of bits that represents the number "minus five"; and
selecting one of said four sets of bits in said multiplexer.

24. The method as claimed in claim 23 further comprising the steps of: sending said selected set of bits from said multiplexer to a first adaptive filter tap cell 12j+1 in a set of twelve adaptive filter tap cells in said decision feedback equalizer, said set of twelve adaptive filter tap cells comprising cell 12j+1 through cell 12j+12, where j may take integer values from zero up to the value X minus 1 where X is the number of stages in said trellis decoder; and reconstructing a symbol stream from said trellis decoder using symbols obtained from said set of twelve adaptive filter tap cells.

* * * * *